(12) United States Patent
Sano et al.

(10) Patent No.: US 8,142,927 B2
(45) Date of Patent: Mar. 27, 2012

(54) LITHIUM SECONDARY BATTERY

(75) Inventors: Atushi Sano, Tokyo (JP); Tsuyoshi Iijima, Tokyo (JP); Satoshi Maruyama, Tokyo (JP); Kazuya Ogawa, Tokyo (JP)

(73) Assignee: TDK Corporation, Tokyo (JP)

( * ) Notice: Subject to any disclaimer, the term of this patent is extended or adjusted under 35 U.S.C. 154(b) by 619 days.

(21) Appl. No.: 11/858,142

(22) Filed: Sep. 20, 2007

(65) Prior Publication Data

US 2008/0014497 A1  Jan. 17, 2008

Related U.S. Application Data

(63) Continuation of application No. 10/247,511, filed on Sep. 20, 2002, now Pat. No. 7,651,815.

(30) Foreign Application Priority Data

| Sep. 21, 2001 | (JP) | 2001-289294 |
| Sep. 28, 2001 | (JP) | 2001-299654 |
| Nov. 8, 2001 | (JP) | 2001-343261 |
| May 31, 2002 | (JP) | 2002-159417 |
| Aug. 9, 2002 | (JP) | 2002-233801 |

(51) Int. Cl.
*H01M 6/04* (2006.01)
*H01M 4/02* (2006.01)
*H01M 4/13* (2010.01)
*H01M 4/58* (2010.01)

(52) U.S. Cl. .................. 429/188; 429/209; 429/231.95; 429/324

(58) Field of Classification Search .................. 429/188, 429/209, 231.95, 324
See application file for complete search history.

(56) References Cited

U.S. PATENT DOCUMENTS

| 4,464,447 A | 8/1984 | Lazzari et al. | |
| 4,654,279 A * | 3/1987 | Bauer et al. | 429/312 |
| 5,538,814 A * | 7/1996 | Kamauchi et al. | 429/303 |
| 6,432,585 B1 | 8/2002 | Kawakami et al. | |

(Continued)

FOREIGN PATENT DOCUMENTS

JP  7-3795  1/1995

(Continued)

*Primary Examiner* — Patrick Ryan
*Assistant Examiner* — Julian Anthony
(74) *Attorney, Agent, or Firm* — Oblon, Spivak, McClelland, Maier & Neustadt, L.L.P.

(57) ABSTRACT

A lithium secondary battery comprising positive and negative electrodes both capable of occluding and releasing lithium ions, and a lithium ion conductive material which contains a compound of formula (1) exhibits improved characteristics including charge/discharge efficiency, low-temperature properties and cycle performance when (a) only one substituent group of $R^1$, $R^2$, $R^3$ and $R^4$ in formula (1) is alkyl, (b) the negative electrode-constituting material partially contains a carboxyl or hydroxyl group-bearing compound, and the lithium ion conductive material contains propylene carbonate, or (c) a positive electrode active material is a lithium-containing transition metal compound, a negative electrode active material is a carbonaceous material, and the lithium ion conductive material contains as a non-aqueous electrolysis solution a solvent mixture of propylene carbonate and ethylene carbonate in combination with a chain-like carbonate as a low-viscosity solvent.

(1)

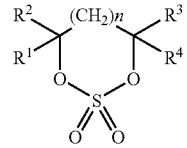

9 Claims, 15 Drawing Sheets

U.S. PATENT DOCUMENTS 6,770,399 B2  8/2004  Umeno et al.

FOREIGN PATENT DOCUMENTS

| JP | 10-134800 | 5/1998 |
| JP | 10-189042 | 7/1998 |
| JP | 11-73990 | 3/1999 |
| JP | 11-162511 | 6/1999 |
| JP | 11-238505 | 8/1999 |
| JP | 2000-3724 | 1/2000 |
| JP | 2000-082492 | 3/2000 |
| JP | 2000-243446 | 9/2000 |
| WO | WO 99/16144 | 4/1999 |

* cited by examiner

LITHIUM SECONDARY BATTERY

This application is a continuation of U.S. application Ser. No. 10/247,511 which was filed on Sep. 20, 2002 and now issued as U.S. Pat. No. 7,651,815.

This invention relates to a lithium secondary battery containing a non-aqueous electrolysis solution, and more particularly, to a modification of electrode surface.

BACKGROUND OF THE INVENTION

With the recent progress of portable or compact equipment, the batteries are also required to reduce their size and weight. Among others, lithium secondary batteries are favorably expected for a high capacity and high energy density. To increase their capacity, improvements in the positive electrode, negative electrode, electrolysis solution and other components have been under study.

Lithium secondary batteries generally use lithium-containing transition metal oxides as typified by $LiCoO_2$, $LiNiO_2$ and $LiMn_2O_4$ as the positive electrode active material; and carbonaceous materials such as graphite and coke as the negative electrode active material. Of these, graphite materials are preferably used because their use as the electrode leads to an increase of energy density per volume.

As the electrolysis solution, solvent mixtures of cyclic carbonates as typified by ethylene carbonate and chain-like carbonates as typified by diethyl carbonate or methyl ethyl carbonate are frequently used.

In particular, cyclic carbonates have a high degree of dissociation of lithium salts, and inter alia, ethylene carbonate has a wide potential window and resistant to oxidation and reduction. It is known that using the cyclic carbonate as a main solvent of a non-aqueous electrolysis solution, lithium secondary batteries having improved charge/discharge characteristics can be fabricated.

However, ethylene carbonate has a problem due to a high melting point (about 37° C.) that it solidifies into a solid at low temperatures including room temperature and has a low conductivity at low temperatures. If a large amount of chain-like carbonate is mixed in order to lower the freezing point at low temperatures, the potential expansion and safety hazard of the battery during high-temperature storage due to the low boiling point and flash point of chain-like carbonate become a concern. Also ethylene carbonate undergoes gradual decomposition with increasing cycles, leading to a degradation of cycle performance.

An attempt was made to use propylene carbonate as the cyclic carbonate having a lower melting point instead of ethylene carbonate. Since propylene carbonate has resistance to oxidative and reductive decomposition and a low freezing point (about −49° C.), it is advantageously used when lithium metal or low crystalline carbon is used as the negative electrode.

However, when graphite is used as the negative electrode, the use of propylene carbonate as a main solvent of an electrolysis solution gives rise to the problem that severe decomposition of propylene carbonate on the negative electrode prohibits charging.

Particularly when synthetic graphite having a high degree of graphitization is used to meet a demand for a higher capacity, the phenomenon that propylene carbonate attacks the laminar structure of graphite becomes more outstanding. This prohibits the use of propylene carbonate as a main solvent in a high proportion.

Techniques of adding an additive to control the decomposition of propylene carbonate and graphite have been reported. JP-A 11-73990 proposes to use a solvent mixture of ethylene sulfite and propylene carbonate. This relies on the mechanism that decomposed products of ethylene sulfite form a coating on the negative electrode to control the decomposition of propylene carbonate.

JP-A 2000-3724 describes that 1,3-propanesultone or 1,4-butanesultone is effective for suppressing decomposition of propylene carbonate. However, these techniques are difficult to improve battery characteristics.

Meanwhile, in order to increase the energy density of a battery, the proportion of active material in the entire battery must be increased. One means for increasing the proportion of active material is to increase the amount of active material loaded per electrode area. The increased amount of active material loaded, however, allows for decomposition of propylene carbonate and graphite even when an additive is used. This is probably because the increased amount of active material loaded leads to a thicker electrode which experiences more polarization and makes it difficult to form a uniform coating.

On the other hand, with respect to lithium ion secondary batteries and lithium ion polymer batteries, the trend of development in the art requires to further increase the battery energy density. A strong demand is imposed on an improved volume energy density that a high capacity is packed within a certain space. The battery energy density can be increased by increasing the capacity of positive and negative electrode active materials while the same purpose can be achieved by increasing the density of electrodes even when conventional positive and negative electrode active materials are used.

The energy density of an electrode can be increased by forming an electrode as by coating, then processing the electrode constituting material under a high pressure to provide a low porosity.

However, a problem arises when the low porosity electrode is used in a battery. Since it allows for less diffusion of lithium ions as compared with conventional electrodes used in lithium ion batteries, the high-rate properties and low-temperature properties of the battery become poorer as the porosity is reduced. A high energy density can be achieved, but the battery characteristics do not reach the practical level.

SUMMARY OF THE INVENTION

An object of the invention is to provide a lithium secondary battery having significantly improved battery characteristics including initial charge/discharge efficiency and cycle performance and remaining fully safe at high temperatures.

Another object of the invention is to provide a lithium secondary battery which is simple to manufacture and easy to handle, is capable of accommodating propylene carbonate, and has improved battery characteristics including charge/discharge efficiency, low-temperature properties and cycle performance.

A further object of the invention is to provide a lithium secondary battery capable of controlling decomposition of propylene carbonate and having improved high-rate properties, low-temperature properties and cycle performance.

A still further object of the invention is to provide a lithium secondary battery having improved high-rate properties, low-temperature properties and cycle performance even when an electrode having a large amount of active material loaded thereon is used.

A yet further object of the invention is to provide a lithium secondary battery having a simple structure and high safety.

A still further object of the invention is to provide a lithium secondary battery having high-rate properties and low-temperature properties which do not deteriorate even when a low porosity electrode intended to provide an increased energy density is used.

The inventors have found that in order that a lithium secondary battery containing propylene carbonate in its electrolysis solution, especially based on a propylene carbonate-rich system, perform in a stable manner, inclusion of a compound of the following formula (1) under specific conditions is effective.

A lithium secondary battery capable of stable, high performance though based on a system containing propylene carbonate, preferably in excess of other solvents, is obtainable when either one of the following requirements (a), (b) and (c) is met; (a) only one substituent group of $R^1$, $R^2$, $R^3$ and $R^4$ in formula (1) is an alkyl group, (b) the negative electrode-constituting material partially contains a carboxyl or hydroxyl group-bearing compound, and the lithium ion conductive material contains propylene carbonate, and (c) a positive electrode active material is a lithium-containing transition metal compound, a negative electrode active material is a carbon material, and the lithium ion conductive material contains as a non-aqueous electrolysis solution a solvent mixture of propylene carbonate and ethylene carbonate in combination with a chain-like carbonate as a low-viscosity solvent.

The above and other objects are achieved by the present invention defined below.

(1) A lithium secondary battery comprising a positive electrode and a negative electrode both capable of occluding and releasing lithium ions, and a lithium ion conductive material, the lithium ion conductive material containing propylene carbonate and a compound of the following formula (1):

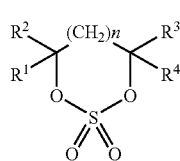

(1)

wherein n is an integer of 0 or 1, each of $R^1$, $R^2$, $R^3$ and $R^4$ is hydrogen or an alkyl group of 1 to 5 carbon atoms, the propylene carbonate accounting for more than 50% by volume of entire solvent components.

(2) The lithium secondary battery of (1) wherein on surface analysis of negative electrode active material by electron spectroscopy for chemical analysis (ESCA), a 2p bond energy spectrum of sulfur atom has a maximum peak value between 168 eV and 172 eV.

(3) The lithium secondary battery of (1) or (2) wherein the compound of formula (1) has a molecular orbital energy of lowest unoccupied molecular orbital (LUMO) of +0.005 to +0.07 eV.

(4) The lithium secondary battery of any one of (1) to (3) wherein in formula (1), only one of $R^1$, $R^2$, $R^3$ and $R^4$ is an alkyl group of 1 or 2 carbon atoms.

(5) The lithium secondary battery of (4) wherein the compound of formula (1) is liquid at normal temperature and normal pressure.

(6) The lithium secondary battery of (4) or (5) wherein the lithium ion conductive material contains a non-aqueous electrolysis solution which is selected from the group consisting of ethylene carbonate, propylene carbonate, butylene carbonate, trifluoropropylene carbonate, γ-butyrolactone, 1,2-dimethoxyethane, 1,2-diethoxyethane, tetrahydrofuran, 2-methyltetrahydrofuran, dimethyl carbonate, diethyl carbonate, ethyl methyl carbonate, dipropyl carbonate and methyl propyl carbonate, and mixtures thereof, and the non-aqueous electrolysis solution contains 0.05 to 50% by weight of the compound of formula (1).

(7) The lithium secondary battery of any one of (4) to (6) wherein the compound of formula (1) is at least one compound selected from 4-methyl-1,3,2-dioxathiolane-2,2-dioxide and 4-ethyl-1,3,2-dioxathiolane-2,2-dioxide.

(8) The lithium secondary battery of any one of (1) to (3) wherein the constituent material of the negative electrode comprises a carboxyl or hydroxyl group-bearing compound as a portion thereof, and said lithium ion conductive material contains propylene carbonate.

(9) The lithium secondary battery of (8) wherein the compound of formula (1) is contained in an amount of 0.01 to 30% by weight.

(10) The lithium secondary battery of (8) or (9) wherein said negative electrode contains 0.01 to 10% by weight of the carboxyl or hydroxyl group-bearing compound.

(11) The lithium secondary battery of any one of (8) to (10) wherein said negative electrode contains synthetic graphite as an active material.

(12) The lithium secondary battery of any one of (1) to (3) wherein a positive electrode active material is a lithium-containing transition metal compound, a negative electrode active material is a carbon material, and a non-aqueous electrolysis solution contains a solvent mixture of propylene carbonate and ethylene carbonate in combination with a chain-like carbonate as a low-viscosity solvent, and the compound of formula (1).

(13) The lithium secondary battery of (12) wherein ethylene carbonate is contained in an amount of less than 20% by volume based on the entire volume of the solvent mixture.

(14) The lithium secondary battery of (12) or (13) wherein a volume proportion of the chain-like carbonate is 20 to 80% by volume based on the entire volume of the solvent mixture.

(15) The lithium secondary battery of any one of (12) to (14) wherein said chain-like carbonate has a viscosity coefficient of up to 1.0 mPa·s at 25° C.

(16) The lithium secondary battery of any one of (1) to (15) wherein a battery structure is a laminate structure having a negative electrode disposed as the outermost layer, the negative electrode as the outermost layer comprising a current collector having an active material coated on either surface thereof.

(17) The lithium secondary battery of any one of (1) to (16) wherein said positive electrode has a porosity of up to 25%, and a non-aqueous electrolyte has a salt concentration in excess of the concentration providing a conductivity peak.

(18) The lithium secondary battery of (17) wherein said non-aqueous electrolyte has a salt concentration of higher than 1 mol·dm$^{-3}$.

(19) The lithium secondary battery of (17) or (18) wherein in said positive electrode, an amount of active material loaded per unit area is at least 20 mg/cm$^2$.

(20) The lithium secondary battery of any one of (17) to (19) which has a laminate structure.

(21) A lithium secondary battery comprising a positive electrode and a negative electrode both capable of occluding and releasing lithium ions, and a lithium ion conductive mate rial, the lithium ion conductive material containing a compound of the following formula (1):

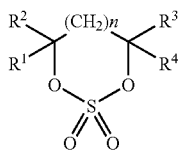

wherein n is an integer of 0 or 1, $R^1$, $R^2$, $R^3$ and $R^4$ each are hydrogen or an alkyl group of 1 to 5 carbon atoms, wherein either one of the following requirements (a), (b) and (c) is met, (a) in formula (1), only one of the substituent groups represented by $R^1$, $R^2$, $R^3$ and $R^4$ is alkyl, (b) the material of which the negative electrode is made comprises a carboxyl or hydroxyl group-bearing compound as a portion thereof, and said lithium ion conductive material contains propylene carbonate, and (c) a positive electrode active material is a lithium-containing transition metal compound, a negative electrode active material is a carbon material, and said lithium ion conductive material contains as a non-aqueous electrolysis solution a solvent mixture of propylene carbonate and ethylene carbonate in combination with a chain-like carbonate as a low-viscosity solvent.

(22) The lithium secondary battery of (21) wherein in formula (1), only one of the substituent groups represented by $R^1$, $R^2$, $R^3$ and $R^4$ is an alkyl group having 1 or 2 carbon atoms.

(23) The lithium secondary battery of (21) wherein the material of which the negative electrode is made comprises a carboxyl or hydroxyl group-bearing compound as a portion thereof, and said lithium ion conductive material contains propylene carbonate.

(24) The lithium secondary battery of (21) wherein a positive electrode active material is a transition metal compound containing lithium, a negative electrode active material is a carbon material, and a non-aqueous electrolysis solution contains a solvent mixture of propylene carbonate and ethylene carbonate in combination with a chain-like carbonate as a low-viscosity solvent, and the compound of formula (1).

(25) A lithium secondary battery comprising a positive electrode, a negative electrode, a separator and a non-aqueous electrode,
said positive electrode has a porosity of up to 25%, and a non-aqueous electrolyte has a salt concentration in excess of the concentration providing a conductivity peak.

(26) The lithium secondary battery of (25) wherein said non-aqueous electrolyte has a salt concentration of higher than 1 mol·dm$^{-3}$.

(27) The lithium secondary battery of (25) wherein in said positive electrode, and amount of active material loaded per unit area is at least 20 mg/cm$^2$.

(28) The lithium secondary battery of (25) which has a laminate structure.

DESCRIPTION OF THE PREFERRED EMBODIMENTS

Figure 1:
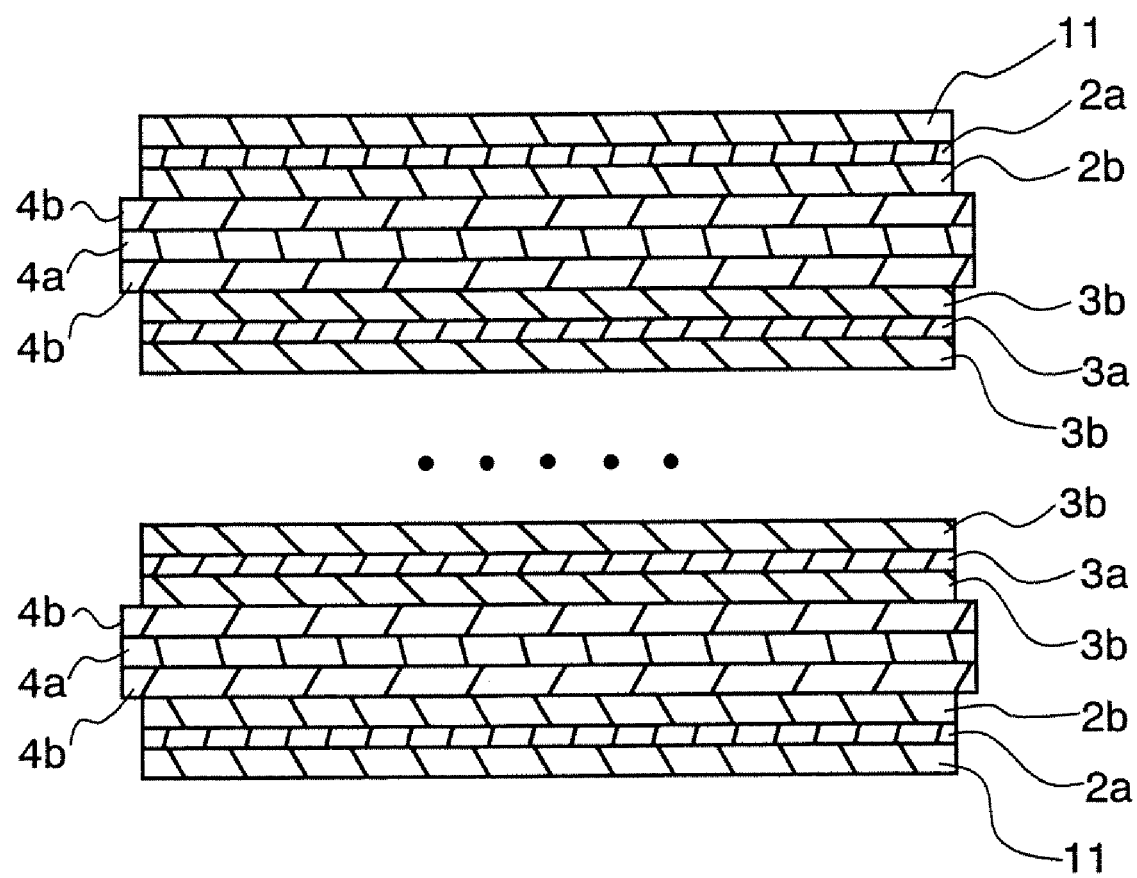
FIG. 1 is a schematic cross-sectional view of the preferred construction of a lithium battery laminate according to the invention.

The lithium secondary battery of the present invention has a positive electrode and a negative electrode both capable of occluding and releasing lithium ions, and a lithium ion conductive material. The lithium ion conductive material contains a compound of the following formula (1):

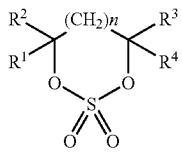

wherein n is an integer of 0 or 1, $R^1$, $R^2$, $R^3$ and $R^4$ each are hydrogen or an alkyl group of 1 to 5 carbon atoms. Either one of the following requirements (a), (b) and (c) is met; (a) only one substituent group of $R^1$, $R^2$, $R^3$ and $R^4$ in formula (1) is an alkyl group, (b) the negative electrode-constituting material partially contains a carboxyl or hydroxyl group-bearing compound, and the lithium ion conductive material contains propylene carbonate, and (c) a positive electrode active material is a lithium-containing transition metal compound, a negative electrode active material is a carbon material, and the lithium ion conductive material contains as a non-aqueous electrolysis solution a solvent mixture of propylene carbonate and ethylene carbonate in combination with a chain-like carbonate as a low-viscosity solvent.

By incorporating the compound of formula (1) so as to satisfy the specific requirement or by incorporating the compound of formula (1) under the specific conditions as mentioned above, a high-performance lithium secondary battery using cyclic carbonate can be achieved.

More particularly, by incorporating the compound of the structure represented by formula (1) in a lithium ion conductive material and conducting at least one cycle of charging, a coating containing at least carbon, oxygen and sulfur elements is formed on the electrode surface. This unique coating restrains decomposition of the electrolysis solution by the electrode and ensures fabrication of a lithium secondary battery having significantly improved charge/discharge efficiency, low-temperature properties and cycle performance, capable of accommodating propylene carbonate, and giving off no gases during high-temperature storage.

Referring to the compounds of formula (1), n is an integer of 0 or 1, and each of $R^1$, $R^2$, $R^3$ and $R^4$ is hydrogen or an alkyl group of 1 to 5 carbon atoms.

In formula (1), the —($CH_2$)— group may be included or not although n=0 is preferred.

Each of $R^1$, $R^2$, $R^3$ and $R^4$ is hydrogen or an alkyl group of 1 to 5 carbon atoms, especially 1 to 3 carbon atoms. It is preferred that at least two, more preferably at least three, especially all of $R^1$, $R^2$, $R^3$ and $R^4$ be hydrogen. The preferred alkyl groups represented by $R^1$, $R^2$, $R^3$ and $R^4$ are, for example, methyl, ethyl, and isopropyl. Of these, methyl is preferred. It is also preferred that either one of $R^1$, $R^2$, $R^3$ and $R^4$ be alkyl, especially methyl and the remaining groups be hydrogen.

$R^1$, $R^2$, $R^3$ and $R^4$ may be the same or different.

Illustrative examples of the compound of formula (1) include 1,3,2-dioxathiolane-2,2-dioxide, 1,3,2-dioxathiane-2,2-dioxide, 4-methyl-1,3,2-dioxathiolane-2,2-dioxide and 4-ethyl-1,3,2-dioxathiolane-2,2-dioxide. Of these, 1,3,2-dioxathiolane-2,2-dioxide is preferred.

An appropriate amount of the compound of formula (1) added is 0.01 to 30% by weight, more preferably 1 to 10% by weight, most preferably 3 to 7% by weight based on the non-aqueous electrolysis solution. When the compound is incorporated in the positive or negative electrode, the preferred amount is 0.01 to 30% by weight, more preferably 1 to 10% by weight based on the electrode material.

In the invention, the coating formed on the surface of negative electrode active material by the compound of formula (1) is preferably such that when the negative electrode active material surface is scan by electron spectroscopy for chemical analysis (ESCA), a 2p bond energy spectrum of sulfur (S) atom has a maximum peak value between 168 eV and 172 eV.

When the 2p maximum peak of S on ESCA falls in the range, an interface having a low impedance is formed.

Further preferably, the compound of formula (1) has an energy level of lowest unoccupied molecular orbital (LUMO, an orbit having the lowest energy level among unoccupied molecular orbits, with excited electrons generally moving to this orbital) of +0.005 to +0.07 eV, more preferably +0.006 to +0.066 eV. The energy level of highest occupied molecular orbital (HOMO) is not critical, but is generally −11 eV to −12 eV. LUMO and HOMO can be computed from the given theoretical values.

When the energy level of LUMO falls within the above range, a coating is formed at a more positive potential than the decomposition potential of electrolysis solution solvent, restraining decomposition of propylene carbonate.

First Embodiment

In the first embodiment of the invention, only one substituent group of $R^1$, $R^2$, $R^3$ and $R^4$ in formula (1) is an alkyl group. That is, the lithium secondary battery in the first embodiment of the invention has a positive electrode, a negative electrode capable of occluding and releasing lithium ions, and a lithium ion conductive material, the lithium ion conductive material containing a compound of the following formula (2).

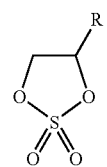

Herein R is preferably an alkyl group of 1 or 2 carbon atoms.

By incorporating the compound of the structure represented by formula (2) in a lithium ion conductive material and conducting at least one cycle of charging, a coating containing at least carbon, oxygen and sulfur elements is formed on the electrode surface. This unique coating restrains decomposition of the electrolysis solution by the electrode and ensures fabrication of a lithium secondary battery having significantly improved charge/discharge efficiency, low-temperature properties and cycle performance, capable of accommodating propylene carbonate, and giving off no gases during high-temperature storage.

The compounds of formula (2) are liquid at normal temperature (room temperature 20° C.) and normal pressure (atmospheric pressure), which eliminates the step of dissolving in a solvent. In contrast, 1,3,2-dioxathiolane-2,2-dioxide and other compounds having a similar structure are solid at normal temperature and normal pressure, and difficult to dissolve in solvents of certain type. Then the aforementioned liquid compounds are very useful in a mass-scale production process because the dissolution step can be omitted.

As compared with solid substances, the aforementioned compounds adsorb less moisture and have a low moisture content. The above-referred 1,3,2-dioxathiolane-2,2-dioxide generally has a moisture content of 0.3% by weight or more since it is solid and thus difficult to dry as by distillation or molecular sieve treatment. In contrast, the compounds of formula (2) can be dried by distillation, molecular sieve treatment or the like, to a moisture content of 300 ppm or lower, especially 100 ppm or lower. The minimized moisture content restrains degradation of the electrode by moisture, contributing to a longer life of the battery.

Referring to the compounds of formula (2), R is as defined for $R^1$, $R^2$, $R^3$ and $R^4$ in formula (1), preferably an alkyl group having 1 or 2 carbon atoms. The preferred alkyl groups represented by R are methyl and ethyl. The alkyl groups represented by R may be substituted ones although unsubstituted alkyl groups are preferred.

Illustrative examples of the compounds of formula (2) include 4-methyl-1,3,2-dioxathiolane-2,2-dioxide and 4-ethyl-1,3,2-dioxathiolane-2,2-dioxide.

An appropriate amount of the compound of formula (2) added is 0.05 to 50% by weight, more preferably 1 to 10% by weight, most preferably 3 to 7% by weight based on the non-aqueous electrolysis solution. When the compound is incorporated in the positive or negative electrode, the preferred amount is 0.05 to 50% by weight, more preferably 1 to 10% by weight based on the electrode material.

Once assembled within a battery and subjected to at least one cycle of charging, the compound of formula (2) is incorporated into the coating that has formed on the negative electrode surface. In the fabrication of batteries, the compound may be dissolved in an electrolysis solution or mixed in a positive or negative electrode material, especially a negative electrode material.

Lithium batteries are generally constructed such that, on the first cycle of charge/discharge, chemical reaction with a non-aqueous solvent which is one component of the lithium ion conductive material takes place on the surface of the positive electrode and/or negative electrode, forming a coating containing oxygen and carbon. On the first charging step, the compound of formula (2) cooperates with the chemical reaction to form a coating containing sulfur, oxygen and carbon on the surface of the positive electrode and/or negative electrode. As compared with the coating in conventional lithium batteries absent the compound of formula (2), this coating has improved permeability to lithium ions and is effective for preventing the electrolysis solution from decomposition reaction by the positive and negative electrodes.

In this way, there is provided a lithium battery having significantly improved battery characteristics including charge/discharge efficiency, low-temperature properties, cycle performance, and long-term stability, and giving off no gases during high-temperature storage.

Second Embodiment

In the second embodiment of the invention, the lithium ion conductive material contains the compound of formula (1), the material of which the negative electrode is made partially contains a carboxyl or hydroxyl group-bearing compound, and the lithium ion conductive material contains propylene carbonate. Specifically, the lithium secondary battery of the second embodiment has a positive electrode and a negative electrode both capable of occluding and releasing lithium ions, and a lithium ion conductive material, wherein the material of which the negative electrode is made comprises a carboxyl or hydroxyl group-bearing compound as a portion thereof, and the lithium ion conductive material contains propylene carbonate and the compound of formula (1).

Suitable carboxyl group-bearing compounds include alkali metal salts and ammonium salts of carboxylic acids such as, for example, lithium acetate, sodium acetate, potassium acetate, lithium trifluoroacetate, ammonium acetate, lithium oxalate, sodium oxalate, and potassium oxalate.

Among polymers having carboxyl groups on side chains are alkali metal salts and ammonium salts of carboxymethyl cellulose, acrylic acid, alginic acid and the like.

Carboxyl groups may also be present as side chains of a polymer which is contained as the binder for electrode active material. Such examples are polyimide resins containing aromatic carboxylic acids and poly(vinylidene fluoride) containing carboxyl groups on side chains.

Suitable hydroxyl group-bearing compounds include polyvinyl alcohol, methyl cellulose, lithium hydroxide, sodium hydroxide, and the like.

When the negative electrode contains such a carboxyl or hydroxyl group-bearing compound, the above-described coating can be effectively formed on the electrode.

From the standpoint of initial charge/discharge efficiency, carboxyl group-bearing compounds are preferred. Thermosetting resins are also preferred as the polymer having carboxyl or hydroxyl groups, especially carboxyl groups.

In the second embodiment, once assembled within a battery and subjected to at least one cycle of charging, the compound of formula (1) is incorporated into the coating formed on the negative electrode surface. At this point, carboxyl or hydroxyl groups existing on the negative electrode serve to form a better coating, which is effective for restraining decomposition of the electrolysis solution, especially propylene carbonate, ensuring stable operation over a long term. In the fabrication of batteries, the compound of formula (1) may be dissolved in an electrolysis solution or mixed in a positive or negative electrode material.

Lithium batteries are generally constructed such that, on the first cycle of charge/discharge, chemical reaction with a non-aqueous solvent which is one component of the lithium ion conductive material takes place on the surface of the positive electrode and/or negative electrode, forming a coating containing oxygen and carbon. On the first charging step, the compound of formula (1) cooperates with carboxyl or hydroxyl groups existing on the negative electrode and also with the chemical reaction to form a coating containing sulfur, oxygen and carbon on the surface of the positive electrode and/or negative electrode. As compared with the coating in conventional lithium batteries absent the compound of formula (1), this coating has improved permeability to lithium ions and is effective for preventing the electrolysis solution from decomposition reaction by the positive and negative electrodes.

In this way, with a system comprising propylene carbonate as the electrolyte, a lithium battery having significantly improved battery characteristics including charge/discharge efficiency, low-temperature properties, cycle performance, and long-term stability, and giving off no gases during high-temperature storage is provided as well.

Third Embodiment

In the third embodiment of the invention, the lithium ion conductive material contains the compound of formula (1), a positive electrode active material is a lithium-containing transition metal compound, a negative electrode active material is a carbon material, and the lithium ion conductive material contains as a non-aqueous electrolysis solution a solvent mixture of propylene carbonate and ethylene carbonate in combination with a chain-like carbonate as a low-viscosity solvent.

By blending a chain-like carbonate in a solvent mixture of propylene carbonate and ethylene carbonate to form a ternary system, including the compound of the structure represented by formula (1) in the ternary system, and using the resulting system as a lithium ion conductive material, a lithium secondary battery capable of restraining decomposition of the electrolysis solution, having improved battery characteristics, and giving off little gases is obtainable. That is, by including the compound of formula (1) in the solvent mixture, a coating containing at least carbon, oxygen and sulfur elements is formed on the surface of electrode active material, especially graphite. This unique coating restrains decomposition of the electrolysis solution by the electrode active material and ensures fabrication of a lithium secondary battery having significantly improved charge/discharge efficiency, low-temperature properties and cycle performance, and giving off no gases during high-temperature storage.

In the third embodiment, once assembled within a battery and subjected to at least one cycle of charging, the compound of formula (1) is incorporated into the coating formed on the negative electrode surface to optimize the coating. The coating is effective for restraining decomposition of the electrolysis solution, especially propylene carbonate, ensuring stable operation over a long term. In the fabrication of batteries, the compound of formula (1) may be dissolved in an electrolysis solution or mixed in a positive or negative electrode material.

Lithium batteries are generally constructed such that, on the first cycle of charge/discharge, chemical reaction with a non-aqueous solvent which is one component of the lithium ion conductive material takes place on the surface of the positive electrode and/or negative electrode, forming a coating containing oxygen and carbon. On the first charging step, the compound of formula (1) cooperates with the chemical reaction to form a coating containing sulfur, oxygen and carbon on the surface of the positive electrode and/or negative electrode, especially the surface of negative electrode active material, graphite. This coating prevents the electrolysis solution from penetrating between lamina within graphite, thereby preventing decomposition of the electrolysis solution and delamination of graphite lamina or cracking due to the interlaminar expansion associated therewith. As compared with the coating in conventional lithium batteries absent the compound of formula (1), this coating has improved permeability to lithium ions and is effective for preventing the electrolysis solution from decomposition reaction by the positive and negative electrodes.

In this way, even with a system comprising propylene carbonate as the electrolyte, a lithium battery having significantly improved battery characteristics including charge/discharge efficiency, low-temperature properties, cycle performance, and long-term stability, and giving off no gases during high-temperature storage is provided as well.

In the third embodiment, the non-aqueous electrolysis solution having a lithium salt dissolved therein is a solvent mixture of propylene carbonate (PC) and ethylene carbonate (EC), which further contains a chain-like carbonate as a low-viscosity solvent.

The co-solvent used with propylene carbonate is preferably an aprotic solvent in which lithium ions are dissolvable, which has a sufficient polarity to provide an ion conductivity, and which does not chemically react with lithium. It serves to dissolve a supporting salt containing lithium ion. In particular, ethylene carbonate is used in the practice of the invention, and it interacts with the compound of formula (1) to form a coating which is satisfactorily permeable to lithium ions.

The content of ethylene carbonate is less than 20% by volume based on the total volume of the solvent mixture which is a non-aqueous electrolyte and at the same time, less than the content of propylene carbonate. By reducing the content of ethylene carbonate in this way, especially below the content of propylene carbonate, the electrolysis solution is reduced in viscosity and freezing point, whereby battery characteristics such as low-temperature properties and high-rate properties are improved.

Specifically, in the non-aqueous electrolysis solution, ethylene carbonate is preferably contained in an amount of 2% by volume or more, especially 5 to 15% by volume.

The low-viscosity solvent is preferably one having a viscosity coefficient η of up to 1.0 mPa·s at 25° C., especially up to 0.8 mPa·s at 25° C. The lower limit is usually about 0.5 mPa·s. By adding a low-viscosity solvent to the solvent mixture, the solvent mixture is improved in wetting properties to enable formation of a uniform coating. It also improves the conductivity of the solution to reduce the potential distribution within the electrode. It is noted that viscosity coefficient is measured by the viscosity test method of JIS Z8803.

Preferred low-viscosity solvents are chain-like carbonates. Examples include dimethyl carbonate (DMC), methyl ethyl carbonate (MEC), diethyl carbonate (DEC), methyl propyl carbonate, methyl isopropyl carbonate, and ethyl propyl carbonate. Inter alia, dimethyl carbonate, methyl ethyl carbonate and diethyl carbonate are preferred for low viscosity.

The content of the chain-like carbonate is preferably 20 to 80% by volume, more preferably 60 to 80% by volume based on the entire solvent mixture.

Examples of the lithium ion-containing supporting salt include such salts as $LiClO_4$, $LiPF_6$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$ and $LiN(CF_3CF_2CO)_2$, and mixtures thereof.

In the electrolysis solution, the concentration of the lithium salt is preferably 0.5 to 3 mol/liter, more preferably 1.3 to 2.5 mol/liter. If the concentration of the lithium salt is above the range, the electrolyte solution has so high a viscosity that high-rate discharge capacity and low-temperature discharge capacity may lower. If the concentration of the lithium salt is below the range, the supply of lithium ions may become short, also inviting a lowering of high-rate discharge capacity and low-temperature discharge capacity.

Lithium Secondary Battery

The structure of the lithium secondary battery is not critical. The battery of the invention generally includes a positive electrode, a negative electrode, and a separator and is applicable to laminate batteries and cylindrical batteries. The positive electrode, separator and negative electrode are stacked in order and compressed into an electrode assembly.

For the electrode, a composition comprising an electrode active material, a binder and optionally, a conductive agent is preferably used.

The preferred positive electrode active material capable of occluding and releasing lithium ions which is used herein is a lithium-containing transition metal oxide represented by $Li_xM_yO_z$ wherein M is at least one transition metal, and x is 0.10 to 1.10. Such a positive electrode active material permits lithium ions to intercalate or deintercalate between lamina. Illustratively, the transition metal is one or more element selected from among Co, Mn, Ni and V. Examples include $LiCoO_2$, $LiMn_2O_4$, $LiNiO_2$, $LiV_2O_4$ and the like. These oxides are in powder form preferably having an average particle size of about 1 to 40 μm.

Examples of the negative electrode active material capable of occluding and releasing lithium ions which is used herein include carbon materials, metallic lithium, lithium alloys and oxides and the like, with the carbon materials being preferred.

Suitable carbon materials include, for example, synthetic graphite, natural graphite, meso-phase carbon microbeads (MCMB), meso-phase carbon fibers (MCF), coke, vitreous carbon, and fired organic polymers. They are generally used in powder form.

Of these, graphite, i.e., synthetic graphite or natural graphite is preferred. Synthetic graphite is more preferred, with synthetic graphite having a lattice spacing of 0.335 to 0.380 nm between lattice faces (002) being most preferred. It is noted that the lattice spacing between lattice faces (002) can be determined by x-ray diffractometry. Natural graphite contains impurities, which can degrade the quality of the coating that the compound of formula (1) forms during the first charging step. Use of synthetic graphite avoids the influence of impurities and affords a coating having good ion permeability.

When the carbon material is used in powder form, it should preferably have an average particle size of 1 to 30 μm, especially 5 to 25 μm. Too small an average particle size tends to reduce the charge/discharge cycle life and increase the variance (or individual difference) of capacity. Too large an average particle size may exaggerate the variance of capacity, resulting in a lower average capacity. The reason why capacity varies over a range when the average particle size is large is presumably that the contact of negative electrode active material (typically graphite) with the current collector and the contact between negative electrode active material particles become inconsistent.

If necessary, a conductive agent is added to the electrode. Exemplary and preferred conductive agents are graphite, carbon black, acetylene black, carbon fibers, and metals such as nickel, aluminum, copper and silver. Inter alia, graphite and carbon black are preferred.

The electrode composition preferably contains, in weight ratio, active material, conductive agent and binder in a ratio of 80-94:2-8:2-18 for the positive electrode, and in a ratio of 70-97:0-25:3-10 for the negative electrode.

The electrode is prepared by first dispersing the active material, binder and optionally, conductive agent in a binder solution to form a coating solution.

As the binder, use may be made of elastomers such as styrene-butadiene rubber (SBR) and resin materials such as poly(vinylidene fluoride) (PVdF). If necessary, an additive such as carboxymethyl cellulose (CMC) may be added.

The electrode coating solution is then applied onto a current collector. The application means is not critical and may be suitably selected depending on the material and shape of the collector. Conventional coating techniques may be used, for example, metal mask printing, electrostatic coating, dip coating, spray coating, roll coating, doctor blade coating, gravure coating, and screen printing. Thereafter, rolling treatment is carried out using a platen press or calender roll, if necessary.

The current collector used herein may be selected from conventional ones depending on the configuration of the device where the battery is used and the arrangement of the collector in a casing. In general, aluminum or the like is used for the positive electrode and copper, nickel or the like is used for the negative electrode. It is noted that a metal foil or metal mesh is generally used as the current collector. The metal mesh usually has a lower contact resistance with the electrode than the metal foil, but the contact resistance of the metal foil is acceptably low.

Then the solvent is evaporated off, completing the electrode. The preferred coating thickness is about 50 to 400 μm.

The battery of the invention uses the above-described solvent mixture, which enables to reduce the potential distribution within the electrode and increase the amount of active material loaded on the electrode.

In the thus obtained electrode, the amount of active material loaded thereon per unit area is preferably at least 10 mg/cm$^2$, especially at least 12 mg/cm$^2$. The upper limit is not critical, but is usually about 300 mg/cm$^2$.

Increasing the amount of active material loaded enables to increase the thickness of the electrode, i.e., the active material-containing layer lying on the collector surface, and hence, increase the energy density and output density of the battery.

In the practice of the invention, the lithium ion conductive material used may be a non-aqueous electrolysis solution having a lithium salt dissolved therein, or a gel-like polymer.

The non-aqueous electrolysis solution having a lithium salt dissolved therein is preferably an aprotic solvent in which lithium ions are dissolvable, which has a sufficient polarity to provide an ion conductivity, and which does not chemically react with lithium. It serves to dissolve a supporting salt containing lithium ion. Examples include ethylene carbonate, propylene carbonate, butylene carbonate, trifluoropropylene carbonate, γ-butyrolactone, 1,2-dimethoxyethane, 1,2-diethoxyethane, tetrahydrofuran, 2-methyltetrahydrofuran, dimethyl carbonate, diethyl carbonate, ethyl methyl carbonate, dipropyl carbonate, and methyl propyl carbonate. Of these, propylene carbonate is especially preferred.

When two or more solvents are used in admixture, it is preferred that the non-aqueous electrolysis solution contain more than 50% by volume, more preferably 60 to 99% by volume, most preferably 80 to 98% by volume of propylene carbonate.

In the first embodiment, propylene carbonate alone or in admixture with another solvent is used as the non-aqueous electrolysis solution having a lithium salt dissolved therein. The co-solvent to propylene carbonate is selected from the aforementioned solvents.

Examples of the lithium ion-containing supporting salt include such salts as $LiClO_4$, $LiPF_6$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$ and $LiN(CF_3CF_2CO)_2$, and mixtures thereof, as enumerated above.

In the electrolysis solution, the concentration of the lithium salt is preferably 0.5 to 3 mol/liter, more preferably 1.3 to 2.5 mol/liter. If the concentration of the lithium salt is above the range, the electrolyte solution has so high a viscosity that high-rate discharge capacity and low-temperature discharge capacity lower. If the concentration of the lithium salt is below the range, the supply of lithium ions becomes short, also inviting a lowering of high-rate discharge capacity and low-temperature discharge capacity.

The gel-like polymers include, for example, polyacrylonitrile, poly(ethylene glycol), poly(vinylidene fluoride) and other polymers which have been swollen with the non-aqueous electrolysis solution having a lithium salt dissolved therein. If it is necessary to prevent short-circuiting between positive and negative electrodes, a porous film of polymer, for example, monoaxially or biaxially oriented film of polyolefin or non-woven fabric of polyolefin may be used as the separator or the substrate for lithium ion conductive polymer.

Preferably, the gel-like polymer forms a film of 5 to 100 μm thick, more preferably 5 to 60 μm thick, most preferably 10 to 40 μm thick.

Other separator-forming materials which can be used as a substitute for the gel-like polymer include one or more polyolefins such as polyethylene and polypropylene (when more than one is used, a laminate of two or more layers of film is contemplated), polyesters such as polyethylene terephthalate, thermoplastic fluoro-resins such as ethylene-tetrafluoroethylene copolymers, and celluloses. When the polymer is in sheet form, a microporous film, woven fabric or non-woven fabric having an air permeability of about 5 to 2,000 sec/100 cc as measured according to JIS P8117 and a gage of about 5 to 100 μm may be used.

Also useful are the separators described in JP-A 9-219184, JP-A 2000-223107 and JP-A 2000-100408.

The casing is typically a laminate film including a metal foil, typically aluminum foil on opposite surfaces of which a thermal adhesive resin layer such as a polyolefin resin layer (e.g., polypropylene and polyethylene) and a heat resistant polyester resin layer are respectively laid. The casing is prepared by heat sealing a pair of laminate films along their three sides such that the thermal adhesive resin layers are bonded together to form a first seal, thus forming a bag having one open side. Alternatively, a bag is formed by folding a single laminate film and heat sealing the opposite sides.

The preferred laminate film is a laminate film of a multi-layer structure including thermal adhesive resin layer/polyester resin layer/metal foil/polyester resin layer stacked in order from inside to outside, because this structure insures insulation between the metal foil of the laminate film and lead-out terminals. The use of such a laminate film is advantageous in the sense that the high-melting polyester resin layer is left non-melted at the end of heat sealing, so that the spacing between the metal foil of the laminate film and lead-out terminals is maintained, insuring insulation therebetween. From these considerations, the polyester resin layer in the laminate film should preferably have a thickness of about 5 to 100 μm.

Provided that the separator has a composition consisting of resin and electrolysis solution, it is preferred from the standpoints of strength and ion conductivity of film that the electrolysis solution account for 40 to 90% by weight.

A battery is fabricated by alternately stacking or winding the electrodes and separator, each prepared as above.

Short-Circuit Preventing Structure in Electrodes

The lithium secondary battery of the invention has as the outermost layer of the electrode structure having a plurality of positive and negative electrodes laminated, a negative electrode serving as an anti-shorting layer for preventing the electrodes from being short-circuited by drawing-in of the current collector metal.

The provision of the anti-shorting negative electrode layer as the outermost layer of the electrode structure ensures that a lithium secondary battery has extremely high safety in that it continues safe internal discharging without incurring serious internal short-circuiting even in an abnormal state as contemplated in a spike test. Still better, the anti-shorting negative electrode layer does not sacrifice battery characteristics since it is provided solely as the outermost layer of the electrode structure. That is, the anti-shorting negative electrode layer does not function as a battery component.

More specifically, the outermost layer of the electrode structure does not contribute to battery characteristics at all in a normal state, but in a state where the internal electrode structure is subjected to serious internal short-circuiting as by spiking, prevents short-circuiting between internal components, especially between electrodes. Particularly in the event where the battery has a laminate structure, if the outermost layer is a metal current collector, a test of forcedly incurring serious internal short-circuiting as by spiking results in the metal collector foil being drawn inward by the spike to develop internal short-circuits. In contrast, the structure of the invention that the surface of the outermost layer is covered with a material layer capable of preventing serious internal short-circuiting minimizes drawing-in of the collector foil on spiking and prevents serious internal short-circuiting.

FIG. 1 illustrates a preferred construction of the lithium secondary battery according to the invention. The battery of the illustrated embodiment includes negative electrodes each consisting of a negative electrode current collector 2a and a negative electrode active material-containing layer 2b, positive electrodes each consisting of a positive electrode current collector 3a and positive electrode active material-containing layers 3b, electrolytes each disposed between the positive and negative electrodes and having a separator 4a interleaved between solid electrolytes 4b. These components are alternately stacked in the order of negative electrode/electrolyte/positive electrode/electrolyte/negative electrode . . . negative electrode/electrolyte/positive electrode/electrolyte/negative electrode. On the outermost layers of this electrode laminate structure (uppermost and lowermost layers in the figure), negative electrode layers (negative electrode active material-containing layers) 11 for preventing short-circuiting are formed and disposed. It is noted that the casing which receives the laminate structure is omitted from the battery shown in FIG. 1.

When the collector foil is punctured in the spiking test, the anti-shorting negative electrode layer has the function of preventing the foil being burred. This anti-shorting layer is preferably formed directly on the collector of the electrode. Also as long as the anti-shorting layer is the outermost layer of the electrode structure, that is, formed on the surface of uppermost and lowermost collectors in the event of laminate type electrode structure, the rear side may be either a positive or a negative electrode. However, to further enhance safety and production efficiency, the anti-shorting layer is preferably formed on the outermost surface of the negative electrode collector.

The anti-shorting layer may be made of an electrochemically inactive material, especially a material resistant to battery electrolysis solution, illustratively battery solid electrolyte materials as well as resins used as the electrode binder, for example, PVdF and the like. Preferably it has the same composition as the negative electrode material, that is, negative electrode active material-containing layer.

Specifically, a mixture of the aforementioned carbonaceous material and a resin is preferred. A composite of graphite and a resin is especially preferred since it can reduce friction and increase lubricity. When productivity is taken into account, it is more preferred to use a double side coated negative electrode as the outermost layer because the desired effects are achieved without a need for a special electrode serving as the outermost layer. The invention effectively functions against serious internal short-circuits particularly when a laminate type battery is constructed.

The thickness of the anti-shorting negative electrode layer is not critical. Too thin a layer may fail to achieve the desired anti-shorting effects whereas too thick a layer raises the undesired problem that the portion which does not contribute to battery characteristics accounts for a larger volume. Specifically, like the electrodes, the anti-shorting negative electrode layer preferably has a thickness of 50 to 400 μm, more preferably 80 to 200 μm.

High Salt Concentration Battery Using Highly Loaded Electrode

Meanwhile, most of currently commercially available lithium ion batteries and lithium ion polymer batteries use lithium hexafluorophosphate as the supporting electrolyte salt. This system generally has an ion conductivity peak near a salt concentration of 1 mol·dm$^{-3}$. In fact, most commercially available batteries have a salt concentration of about 1 mol·dm$^{-3}$.

However, if batteries are fabricated using the aforementioned high energy density electrode and at the salt concentration corresponding to a conductivity peak, preferably about 1 mol·dm$^{-3}$, there arises the problem that the batteries are below the practically acceptable level because high-rate and low-temperature properties degrade. It is believed that this problem is ascribed to the diffusion of lithium ions within the electrodes and that any improvement in this regard is very difficult.

However, the present inventors have discovered that for a high energy density electrode having a low porosity, high-rate charge/discharge properties and low-temperature charge/discharge properties can be improved by setting a higher salt concentration than the salt concentration corresponding to an ion conductivity peak, preferably about 1 mol·dm$^{-3}$. The reason is presumed as follows. With ordinary electrodes, battery characteristics peak at the ion conductivity peak. In the case of a high energy density electrode having a low porosity, since ion diffusion is substantially poorer than in ordinary electrodes, the distribution of lithium ions within the electrode has an outstanding difference in concentration, which increases concentration polarization, which in turn, governs property degradation.

In the battery of the invention, the salt concentration of the electrolyte is preferably set higher than the concentration affording the ion conductivity peak, referred to as peak concentration, hereinafter. More preferably the salt concentration is set to at least 110%, especially at least 130% of the peak concentration. The upper limit is preferably up to 300%, especially up to 250% of the peak concentration.

The concentration affording the ion conductivity peak differs with a particular type of salt. While the above-enumerated salts are generally used, preferably lithium hexafluorophosphate (LiPF$_6$), LiClO$_4$, LiN(SO$_2$CF$_3$)$_2$, LiN(SO$_2$CF$_2$CF$_3$)$_2$, LiCF$_3$SO$_3$, LiCF$_3$CF$_2$SO$_3$, LiC(CF$_3$SO$_2$)$_3$, LiN(CF$_3$SO$_2$)(C$_4$F$_9$SO$_2$), LiN(CF$_3$CF$_2$CO)$_2$, LiBF$_4$, LiAsF$_6$, etc. are used, the concentration is approximately 1 mol·dm$^{-3}$ for lithium hexafluorophosphate (LiPF$_6$), and a higher concentration, especially of at least 1.3 mol·dm$^{-3}$ is preferred. The upper limit is approximately 3 mol·dm$^{-3}$.

Since the electrode is compressed in order to acquire a high density, its porosity is up to 25%, preferably up to 20%. The lower limit is about 5%. It is noted that porosity P is determined by the following equation, for example.

$P=[1-($amount of active material loaded per unit area$)/(($coating thickness$)\times($ratio of active material in coating$)\times($coating true density$))]\times 100\%$ Any compression means such as a roll press may be used for compressing electrodes or the like to acquire a high density. The pressure used in compression is about 150 kg/cm to 800 kg/cm as expressed by a linear pressure of a roll press.

Since a high electrode density allows those components which do not relate to battery capacity such as separator and current collector to be reduced, increasing the amount of active material loaded is also effective. However, since most commercially available lithium ion batteries are manufactured to the round type, increasing the amount of active material loaded gives rise to the problem that cracks and defects develop when the electrode is wound up.

Then, a laminate type battery is preferred in order for a highly loaded, low porosity, high energy density electrode to be used in a battery.

For the positive electrode, the amount of active material loaded per unit area is preferably at least 20 mg/cm$^2$, more preferably at least 23 mg/cm$^2$, with the upper limit being about 300 mg/cm$^2$.

By providing the electrode with a large amount of active material loaded and a low porosity to produce a high energy density electrode and by setting the salt concentration of non-aqueous electrolyte above the concentration affording a conductivity peak, preferably higher than 1 mol·dm$^{-3}$, a battery exhibiting a high energy density can be established without degrading high-rate charge/discharge properties and low-temperature charge/discharge properties.

EXAMPLE

Examples of the invention are given below by way of illustration and not by way of limitation.
First Embodiment Example A-1

A positive electrode was prepared by mixing 90 parts by weight of LiCoO$_2$ as a positive electrode active material, 6 parts by weight of carbon black as a conductive agent, and 4 parts by weight of PVdF as a binder. The positive electrode mix was dispersed in N-methyl-2-pyrrolidone as a solvent to form a slurry. The slurry was applied to an Al foil as a current collector and dried to complete the positive electrode.

A negative electrode was prepared by dispersing 90 parts by weight of synthetic spherical graphite powder as a negative electrode active material and 10 parts by weight of PVdF as a binder in N-methyl-2-pyrrolidone to form a slurry. The slurry was applied to a Cu foil as a current collector and dried to complete the negative electrode.

A non-aqueous electrolysis solution was prepared by dissolving LiPF$_6$ as a solute in propylene carbonate as a solvent in a concentration of 1 mol·dm$^{-3}$ and further dissolving 5 parts by weight of 4-methyl-1,3,2-dioxathiolane-2,2-dioxide having the structure shown below.

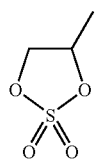

A cell was constructed by sandwiching a gel-like electrolyte containing a polymer having vinylidene fluoride units between the above-prepared positive and negative electrodes, impregnating with the electrolysis solution and stacking such layers. The laminate was enclosed with an aluminum-laminated film, which was sealed to complete a laminate type lithium polymer battery.

Example A-2

A battery was manufactured as in Example A-1 except that an electrolysis solution obtained by dissolving 5 parts by weight of 4-methyl-1,3,2-dioxathiolane-2,2-dioxide in a solvent mixture of 75% by volume of propylene carbonate and 25% by volume of ethylene carbonate was used.

Example A-3

A battery was manufactured as in Example A-1 except that an electrolysis solution obtained by dissolving 5 parts by weight of 4-methyl-1,3,2-dioxathiolane-2,2-dioxide in a solvent mixture of 50% by volume of propylene carbonate and 50% by volume of ethylene carbonate was used.

Example A-4

A battery was manufactured as in Example A-1 except that a non-aqueous electrolysis solution obtained by dissolving 5 parts by weight of 4-ethyl-1,3,2-dioxathiolane-2,2-dioxide in propylene carbonate as the solvent was used.

Example A-5

A battery was manufactured as in Example A-1 except that an electrolysis solution obtained by dissolving 5 parts by weight of 4-methyl-1,3,2-dioxathiolane-2,2-dioxide in a solvent mixture of 30% by volume of ethylene carbonate and 70% by volume of diethyl carbonate was used.

Comparative Example A-1

A battery was manufactured as in Example A-1 except that 5 parts by weight of 1,3,2-dioxathiolane-2,2-dioxide was mixed with propylene carbonate as the solvent of the non-aqueous electrolysis solution.

Comparative Example A-2

A battery was manufactured as in Example A-1 except that 5 parts by weight of ethylene sulfite was mixed with propylene carbonate as the solvent of the non-aqueous electrolysis solution.

Comparative Example A-3

A battery was manufactured as in Example A-1 except that 5 parts by weight of 1,3-propanesultone was mixed with propylene carbonate as the solvent of the non-aqueous electrolysis solution.

Comparative Example A-4

A battery was manufactured as in Example A-1 except that 5 parts by weight of vinylene carbonate was mixed with propylene carbonate as the solvent of the non-aqueous electrolysis solution.

Comparative Example A-5

A battery was manufactured as in Example A-1 except that a solvent mixture of 30% by volume of ethylene carbonate and 70% by volume of diethyl carbonate was used as the solvent of the non-aqueous electrolysis solution.

On each of the batteries of Examples A-1 to A-5 and Comparative Examples A-1 to A-5, a charge/discharge test was carried out at 25° C. with a constant current flow of 0.12 A (0.2 C), a charge cut-off voltage of 4.2 V and a discharge cut-off voltage of 3.0 V. Table 1 shows a charge/discharge efficiency of the first cycle and a capacity retentivity after 300 cycles of 1 C charge/discharge.

TABLE 1

| Sample | Additive | Solvent (weight ratio) | Initial charge/discharge efficiency (%) | Capacity retentivity after 300 cycles (%) |
|---|---|---|---|---|
| EX A-1 | 4-methyl-1,3,2-dioxathiolane-2,2-dioxide | PC 100% | 89.0 | 96.5 |
| EX A-2 | 4-methyl-1,3,2-dioxathiolane-2,2-dioxide | PC + EC (3:1) | 89.7 | 95.8 |
| EX A-3 | 4-methyl-1,3,2-dioxathiolane-2,2-dioxide | PC + EC (1:1) | 91.6 | 94.0 |
| EX A-4 | 4-ethyl-1,3,2-dioxathiolane-2,2-dioxide | PC: 100% | 87.6 | 97.7 |
| EX A-5 | 4-methyl-1,3,2-dioxathiolane-2,2-dioxide | EC:DEC (3:7) | 92.0 | 93.2 |
| CE A-1 | 1,3,2-dioxathiolane-2,2-dioxide | PC: 100% | 88.8 | 91.6 |
| CE A-2 | ethylene sulfite | PC: 100% | non-chargeable | — |
| CE A-3 | 1,3-propanesultone | PC: 100% | 78.1 | 85.1 |
| CE A-4 | vinylene carbonate | PC: 100% | 56.9 | 69.8 |
| CE A-5 | none | EC + DEC (3:7) | 88.2 | 85.7 |

PC: propylene carbonate
EC: ethylene carbonate
DEC: diethyl carbonate

The batteries of Examples A-1 to A-3, in which 4-methyl-1,3,2-dioxathiolane-2,2-dioxide forms a coating which suppresses decomposition of propylene carbonate, show a high initial charge/discharge efficiency and excellent cycle performance. Similar effects are observed with 4-ethyl-1,3,2-dioxathiolane-2,2-dioxide used in Example A-4. However, the batteries of Comparative Examples A-2 to A-4, in which the additive forms an insufficient coating, show a low initial charge/discharge efficiency and poor cycle performance.

In Comparative Example A-1, 1,3,2-dioxathiolane-2,2-dioxide shows a high initial charge/discharge efficiency and excellent cycle performance, but contains much moisture because of its solid state which prohibits moisture removal by distillation or drying by molecular sieves. The water promotes decomposition of the supporting salt in the electrolysis solution so that the electrolysis solution degrades sharply with the passage of time. In contrast, 4-methyl-1,3,2-dioxathiolane-2,2-dioxide is easy to dry by distillation or molecular sieves so that the influence of moisture is minimized. Accordingly, use of 4-methyl-1,3,2-dioxathiolane-2,2-dioxide prevents the electrolysis solution from degradation and is easy to handle in the manufacturing process.

Second Embodiment

Example B-1

A negative electrode was prepared by mixing 96 parts by weight of massive synthetic graphite as a negative electrode active material with 3 parts by weight of styrene-butadiene rubber (SBR) and 1 part by weight of carboxymethyl cellulose (CMC) as a binder, and adding distilled water thereto to form a slurry. The slurry was applied to an electrolytic copper foil as a current collector by a doctor blade technique, and dried at 110° C., followed by rolling to complete the negative electrode.

A positive electrode was prepared using 90 parts by weight of $LiCoO_2$ as a positive electrode active material, 6 parts by weight of carbon black as a conductive agent, and 4 parts by weight of PVdF as a binder. They were mixed and dispersed in N-methyl-2-pyrrolidone as a solvent to form a slurry. The slurry was applied to an aluminum foil as a current collector and dried, followed by rolling to complete the positive electrode.

A non-aqueous electrolysis solution was prepared by dissolving $LiPF_6$ as a solute in propylene carbonate as a solvent in a concentration of 1 $mol \cdot dm^{-3}$ and further dissolving 5 parts by weight of 1,3,2-dioxathiolane-2,2-dioxide.

The above-prepared positive and negative electrodes, and separators were stacked to form a laminate. The laminate was enclosed with an aluminum-laminated pack, which was vacuum sealed to complete a battery.

The initial charge/discharge efficiency and cycle performance of the battery thus constructed are shown in Table 2.

Example B-2

A battery was manufactured as in Example B-1 except that a mixture of propylene carbonate and ethylene carbonate in a volume ratio of 9:1 was used as the solvent of the electrolysis solution.

Example B-3

A battery was manufactured as in Example B-1 except that a mixture of propylene carbonate and ethylene carbonate in a volume ratio of 1:1 was used as the solvent of the electrolysis solution.

Example B-4

A battery was manufactured as in Example B-1 except that the negative electrode components were mixed so as to give a composition of synthetic graphite:SBR:CMC=95:1:4 in weight ratio.

Example B-5

A battery was manufactured as in Example B-1 except that the negative electrode components were mixed so as to give a composition of synthetic graphite:SBR:CMC=96:2:2 in weight ratio.

Example B-6

A battery was manufactured as in Example B-1 except that the negative electrode components were mixed so as to give a composition of synthetic graphite:SBR:CMC=96:3.3:0.7 in weight ratio.

Example B-7

A battery was manufactured as in Example B-1 except that the negative electrode components were mixed so as to give a composition of synthetic graphite:SBR:CMC=96:3.7:0.3 in weight ratio.

Example B-8

A negative electrode was prepared by mixing 92 parts by weight of synthetic graphite as a negative electrode active material with 7 parts by weight of PVdF and 1 part by weight of CMC as a binder. The mixture was dispersed in N-methyl-2-pyrrolidone to form a slurry. The slurry was applied to an electrolytic copper foil as a current collector by a doctor blade technique, and dried at 110° C., followed by rolling to complete the negative electrode.

Aside from using the negative electrode prepared above, a battery was manufactured as in Example B-1.

Example B-9

A battery was manufactured as in Example B-8 except that a mixture of propylene carbonate and ethylene carbonate in a volume ratio of 9:1 was used as the solvent of the electrolysis solution.

Example B-10

A battery was manufactured as in Example B-8 except that a mixture of propylene carbonate and ethylene carbonate in a volume ratio of 1:1 was used as the solvent of the electrolysis solution.

Example B-11

A battery was manufactured as in Example B-8 except that the negative electrode components were mixed so as to give a composition of synthetic graphite:PVdF:CMC=92:4:4 in weight ratio.

Example B-12

A battery was manufactured as in Example B-8 except that the negative electrode components were mixed so as to give a composition of synthetic graphite:PVdF:CMC=92:6:2 in weight ratio.

Example B-13

A battery was manufactured as in Example B-8 except that the negative electrode components were mixed so as to give a composition of synthetic graphite:PVdF:CMC=92:7.3:0.7 in weight ratio.

Example B-14

A battery was manufactured as in Example B-1 except that the negative electrode components were mixed so as to give a composition of synthetic graphite:SBR:CMC=92:7.7:0.3 in weight ratio.

Example B-15

A battery was manufactured as in Example B-2 except that the negative electrode components were mixed so as to give a composition of synthetic graphite:SBR:sodium polyacrylate=96:1:3 in weight ratio.

Example B-16

A battery was manufactured as in Example B-2 except that the negative electrode components were mixed so as to give a composition of synthetic graphite:PVdF:sodium polyacrylate=92:7:1 in weight ratio.

Example B-17

A battery was manufactured as in Example B-2 except that the negative electrode components were mixed so as to give a composition of synthetic graphite:SBR:sodium alginate=96:2:2 in weight ratio.

Example B-18

A battery was manufactured as in Example B-2 except that the negative electrode components were mixed so as to give a composition of synthetic graphite:PVdF:sodium alginate=92:7:1 in weight ratio.

Example B-19

A battery was manufactured as in Example B-2 except that the negative electrode components were mixed so as to give a composition of synthetic graphite:SBR:methyl cellulose:sodium acetate=95:2:2:1 in weight ratio.

Example B-20

A battery was manufactured as in Example B-2 except that the negative electrode components were mixed so as to give a composition of synthetic graphite:PVdF:sodium acetate=92:7:1 in weight ratio.

Example B-21

A battery was manufactured as in Example B-2 except that the negative electrode components were mixed so as to give a composition of synthetic graphite:SBR:methyl cellulose:sodium trifluoroacetate=95:2:2:1 in weight ratio.

Example B-22

A battery was manufactured as in Example B-2 except that the negative electrode components were mixed so as to give a composition of synthetic graphite:PVdF:sodium trifluoroacetate=92:7:1 in weight ratio.

Example B-23

A battery was manufactured as in Example B-2 except that the negative electrode components were mixed so as to give a composition of synthetic graphite:polyimide resin=92:8 in weight ratio.

Example B-24

A battery was manufactured as in Example B-2 except that the negative electrode components were mixed so as to give a composition of synthetic graphite:SBR:polyvinyl alcohol=90:2:8 in weight ratio.

Comparative Example B-1

A battery was manufactured as in Example B-1 except that a negative electrode was prepared according to the procedure of Example B-1 using 92 parts by weight of synthetic graphite as a negative electrode active material and 8 parts by weight of PVdF as a binder.

Comparative Example B-2

A battery was manufactured as in Comparative Example B-1 except that a mixture of propylene carbonate and ethylene carbonate in a volume ratio of 9:1 was used as the solvent of the electrolysis solution.

Comparative Example B-3

A battery was manufactured as in Comparative Example B-1 except that a mixture of propylene carbonate and ethylene carbonate in a volume ratio of 1:1 was used as the solvent of the electrolysis solution.

Comparative Example B-4

A battery was manufactured as in Example B-1 except that the negative electrode components were mixed so as to give a composition of synthetic graphite:SBR:methyl cellulose=96:2:2 in weight ratio.

Comparative Example B-5

A battery was manufactured as in Example B-1 except that the electrolysis solution used contained 1 mol·dm$^{-3}$ of LiPF$_6$ as a solute in propylene carbonate as a solvent, but was free of 5 parts by weight of 1,3,2-dioxathiolane-2,2-dioxide.

Comparative Example B-6

A battery was manufactured as in Comparative Example B-4 except that a mixture of propylene carbonate and ethylene carbonate in a volume ratio of 9:1 was used as the solvent of the electrolysis solution.

Comparative Example B-7

A battery was manufactured as in Comparative Example B-4 except that a mixture of propylene carbonate and ethylene carbonate in a volume ratio of 1:1 was used as the solvent of the electrolysis solution.

Comparative Example B-8

A battery was manufactured as in Example B-1 except that the electrolysis solution used contained 1 mol·dm$^{-3}$ of LiPF$_6$ as a solute in propylene carbonate as a solvent and 5 parts by weight of ethylene sulfite.

Comparative Example B-9

A battery was manufactured as in Example B-8 except that the electrolysis solution used contained 1 mol·dm$^{-3}$ of LiPF$_6$ as a solute in propylene carbonate as a solvent and 5 parts by weight of 1,3-propanesultone.

Comparative Example B-10

A battery was manufactured as in Example B-1 except that a mixture of ethylene carbonate and diethyl carbonate in a volume ratio of 3:7 was used as the solvent of the electrolysis solution.

Table 2 shows the initial charge/discharge efficiency and capacity retentivity after 200 cycles of the batteries of Examples B-1 to B-24 and Comparative Examples B-1 to B-10. The initial charging was constant current charging of 120 mA (0.2 C). After the battery voltage reached 4.2 V, constant voltage charging took over. Charging was terminated when the current flow during the constant voltage charging reached 20 mA.

The initial discharging was constant current discharging of 120 mA (0.2 C). When the battery voltage reached 3.0 V, the discharging was terminated. The initial charge/discharge efficiency is the discharge capacity divided by the charge capacity.

The cycle performance was examined by repeating cycles of constant current, low voltage charging of 600 mAh (1 C) and 4.2 V, and constant current discharging of 600 mAh (1 C) to 3.0 V. The capacity retentivity is the discharge capacity after 200 cycles divided by the initial discharge capacity.

of Comparative Examples B-5 to B-7 were unable to charge/discharge. This is presumably because a satisfactory coat did not form in the absence of 1,3,2-dioxathiolane-2,2-dioxide.

Examples B-8 to B-10 were lower in initial charge/discharge efficiency than the battery using SBR, a water-soluble binder, but able to charge/discharge. Comparative Examples B-4 and B-5 having a higher content of propylene carbonate were unable to charge/discharge. Comparative Example B-3 was able to charge/discharge due to a low PC content, despite the absence of CMC. Comparative Examples B-4 and B-5 were unable to charge/discharge probably because coat formation is not promoted in the absence of CMC. Comparative Example B-3 having a low content of propylene carbonate

TABLE 2

| Sample | Binder | Carboxyl or hydroxyl group-containing compound (wt %) | Electrolysis solution additive | Propylene carbonate content (vol %) | Initial charge/discharge efficiency (%) | Capacity retentivity after 200 cycles (%) |
|---|---|---|---|---|---|---|
| EX B-1 | SBR | CMC: 1 | A | 100 | 90 | 94 |
| EX B-2 | SBR | CMC: 1 | A | 90 | 90 | 92 |
| EX B-3 | SBR | CMC: 1 | A | 50 | 91 | 86 |
| EX B-4 | SBR | CMC: 4 | A | 100 | 89 | 76 |
| EX B-5 | SBR | CMC: 2 | A | 100 | 91 | 89 |
| EX B-6 | SBR | CMC: 0.7 | A | 100 | 87 | 88 |
| EX B-7 | SBR | CMC: 0.3 | A | 100 | 78 | 56 |
| EX B-8 | PVdF | CMC: 1 | A | 100 | 83 | 90 |
| EX B-9 | PVdF | CMC: 1 | A | 90 | 89 | 87 |
| EX B-10 | PVdF | CMC: 1 | A | 50 | 89 | 84 |
| EX B-11 | PVdF | CMC: 4 | A | 100 | 88 | 72 |
| EX B-12 | PVdF | CMC: 2 | A | 100 | 88 | 84 |
| EX B-13 | PVdF | CMC: 0.7 | A | 100 | 81 | 68 |
| EX B-14 | PVdF | CMC: 0.3 | A | 100 | 72 | 54 |
| EX B-15 | SBR | Na polyacrylate (3) | A | 90 | 88 | 83 |
| EX B-16 | PVdF | Na polyacrylate (1) | A | 90 | 86 | 90 |
| EX B-17 | SBR | Na alginate (2) | A | 90 | 86 | 90 |
| EX B-18 | PVdF | Na alginate (1) | A | 90 | 85 | 91 |
| EX B-19 | SBR | Na acetate (1) | A | 90 | 88 | 92 |
| EX B-20 | PVdF | Na acetate (1) | A | 90 | 85 | 93 |
| EX B-21 | SBR | Na Tfac (1) | A | 90 | 86 | 88 |
| EX B-22 | PVdF | Na Tfac (1) | A | 90 | 85 | 89 |
| EX B-23 | polyimide | polyimide | A | 90 | 90 | 90 |
| CE B-1 | PVdF | — | A | 100 | non-chargeable | — |
| CE B-2 | PVdF | — | A | 90 | non-chargeable | — |
| CE B-3 | PVdF | — | A | 50 | 85 | 79 |
| CE B-4 | SBR | — | A | 100 | non-chargeable | — |
| CE B-5 | SBR | CMC: 1 | — | 100 | non-chargeable | — |
| CE B-6 | SBR | CMC: 1 | — | 90 | non-chargeable | — |
| CE B-7 | SBR | CMC: 1 | — | 50 | non-chargeable | — |
| CE B-8 | SBR | CMC: 1 | B | 100 | non-chargeable | — |
| CE B-9 | SBR | CMC: 1 | C | 100 | 81 | 80 |
| CE B-10 | SBR | CMC: 1 | — | 0 | 86 | 82 |
| EX B-24 | SBR | PVA: 8 | A | 90 | 84 | 85 |

Figure 2:
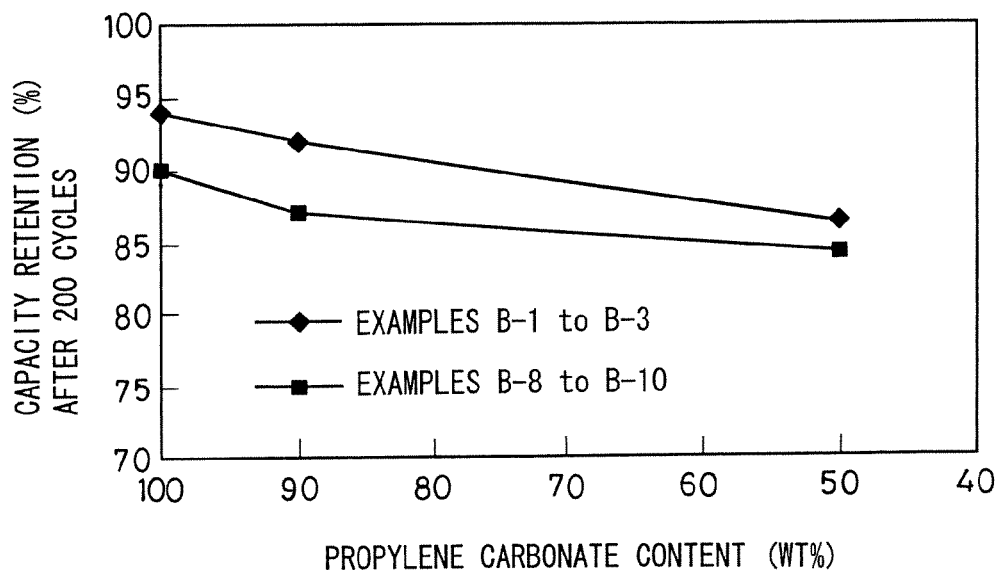
FIG. 2 is a graph showing the capacity retentivity after 200 cycles versus propylene carbonate content (wt %) of Examples B-1 to B-3 and B-8 to B-10.
Figure 3:
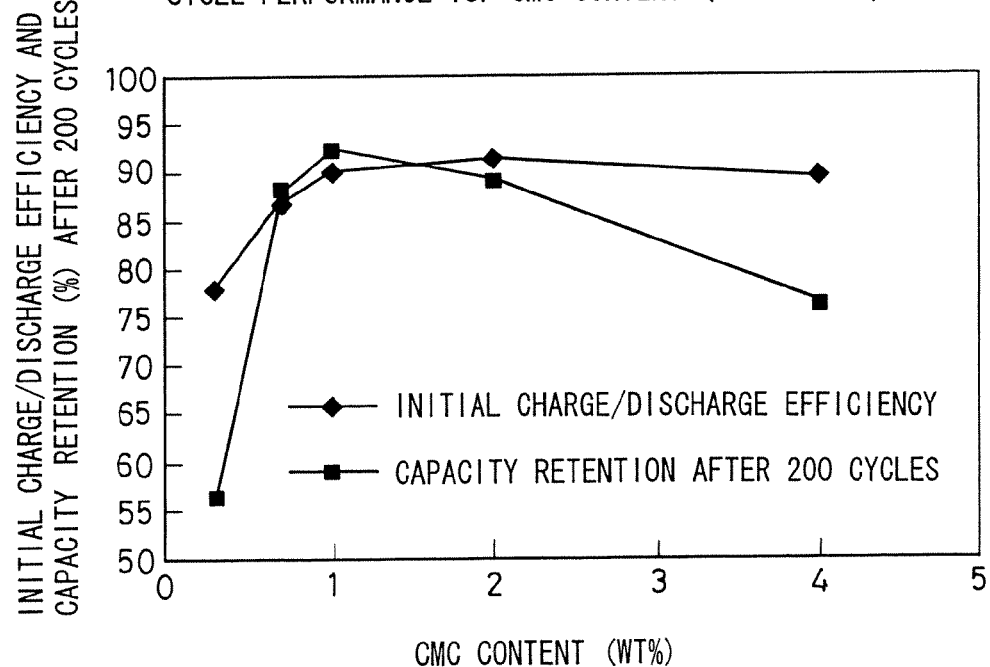
FIG. 3 is a graph showing the initial charge/discharge efficiency and capacity retentivity after 200 cycles versus CMC content (wt %) when SBR is used.
Figure 4:
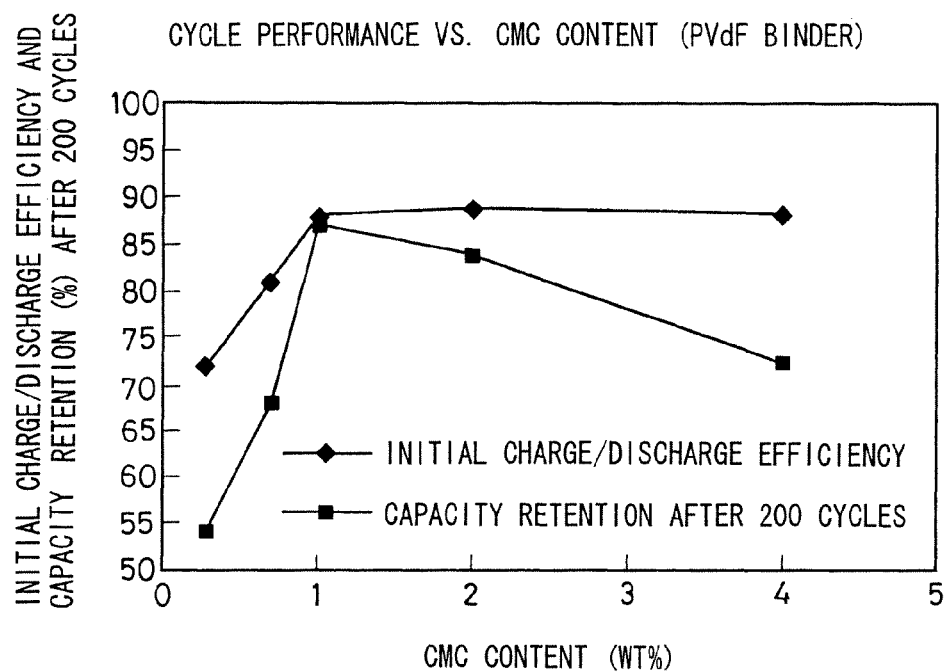
FIG. 4 is a graph showing the initial charge/discharge efficiency and capacity retentivity after 200 cycles versus CMC content (wt %) when PVdF is used.
Figure 5:
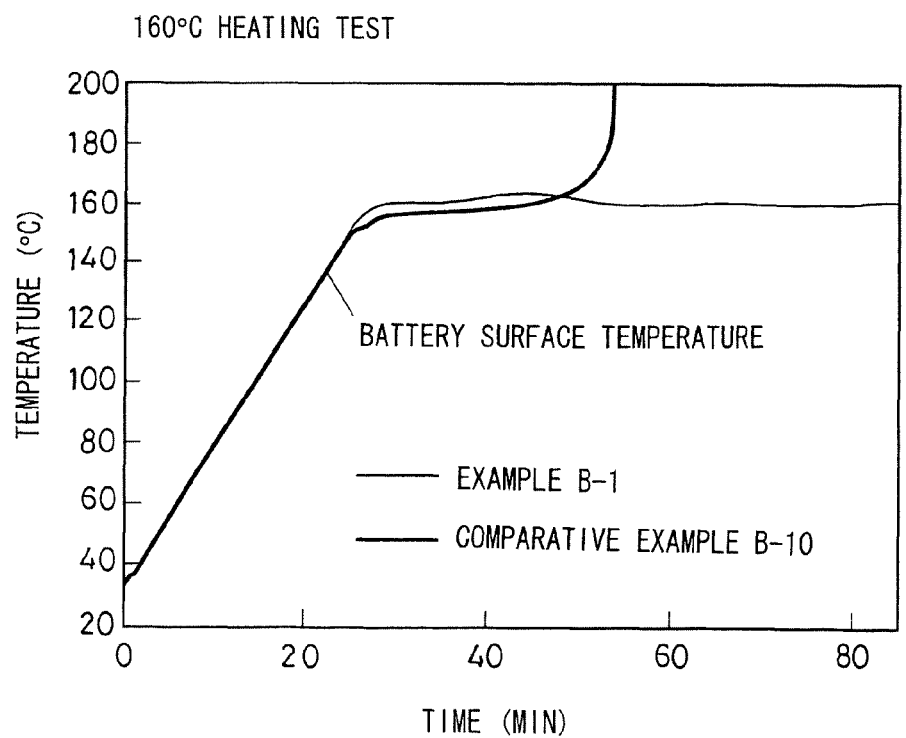
FIG. 5 is a graph showing the results of a 160° C. heating test on Example B-1 and Comparative Example B-10.

A: 1,3,2-dioxathiolane-2,2-dioxide
B: ethylene sulfite
C: 1,3-propanesultone
Na Tfac: sodium trifluoroacetate
EX: Example
CE: Comparative Example FIG. 2 shows the capacity retentivity after 200 cycles versus the content (wt %) of propylene carbonate of Examples B-1 to B-3 and B-8 to B-10. FIG. 3 shows the initial charge/discharge efficiency and capacity retentivity after 200 cycles versus the content (wt %) of CMC when SBR is used. FIG. 4 shows the initial charge/discharge efficiency and capacity retentivity after 200 cycles versus the content (wt %) of CMC when PVdF is used. FIG. 5 shows the results of a 160° C. heating test of Example B-1 and Comparative Example B-10.

As is evident from these results, all the batteries of Examples B-1 to B-3 were able to charge/discharge and improved in cycle performance. In contrast, all the batteries was able to charge/discharge in the absence of CMC, but had a low initial charge/discharge efficiency as compared with Example B-10.

Examples B-1 to B-3 and Examples B-8 to B-10, taken in light of FIG. 2 showing the cycle performance versus propylene carbonate content, reveal that better cycle performance is achievable with a higher content of propylene carbonate.

FIGS. 3 and 4 show the results of Examples B-4 to B-7 where the concentration of CMC was changed, indicating that CMC concentrations in excess of 1% by weight lead to increased initial charge/discharge efficiency, but too high CMC concentrations lead to poor cycle performance. This is presumably because higher CMC concentrations relative to the binder exacerbate the adhesion of active material to the current collector to permit delamination to occur during the charge/discharge cycles, resulting in a reduced discharge capacity. The same propensity is observed in Examples B-11 to B-14.

Comparative Example B-10, which does not contain propylene carbonate, shows inferior cycle performance to Examples B-1 and B-2 which contain at least 90% of propylene carbonate. A 160° C. heating test revealed that as shown in FIG. 5, the battery of Example B-1 did not burst or ignite for 60 minutes after 160° C. was reached, whereas the battery of Comparative Example B-10 burst and ignited at 10 minutes after 160° C. was reached.

It is evident from the results of the foregoing Examples and Comparative Examples that 1,3,2-dioxathiolane-2,2-dioxide contained in the electrolysis solution interacts with carboxyl or hydroxyl groups contained in the negative electrode to restrain decomposition of propylene carbonate.

As understood from the above, the second embodiment enables to use propylene carbonate in a high proportion and provides a battery having improved initial charge/discharge efficiency and cycle performance as well as high safety at elevated temperatures.

Third Embodiment

Example C-1

A positive electrode was prepared by mixing 90 parts by weight of $LiNi_{0.33}Mn_{0.33}Co_{0.33}O_2$ as a positive electrode active material, 6 parts by weight of carbon black as a conductive agent, and 4 parts by weight of PVdF as a binder. The positive electrode mix was dispersed in N-methyl-2-pyrrolidone as a solvent to form a slurry. The slurry was applied to an Al foil as a current collector and dried to complete the positive electrode.

A negative electrode was prepared by dispersing 90 parts by weight of synthetic fibrous graphite powder (having a lattice spacing between lattice faces (002) of 0.3355 nm) as a negative electrode active material and 10 parts by weight of PVdF as a binder in N-methyl-2-pyrrolidone to form a slurry. The slurry was applied to a Cu foil as a current collector and dried to complete the negative electrode. The amount of synthetic graphite powder loaded per unit area was 14 mg/cm$^2$.

A non-aqueous electrolysis solution was prepared by mixing propylene carbonate (PC), ethylene carbonate (EC) and diethyl carbonate (DEC) having a viscosity coefficient of 0.75 mPa·s in a volume ratio of 2:1:7, dissolving $LiPF_6$ as a solute in the solvent mixture in a concentration of 1.5 mol·dm$^{-3}$ and further dissolving 5 parts by weight of 1,3,2-dioxathiolane-2,2-dioxide.

A cell was constructed by sandwiching a separator coated with a gel-like electrolyte between the above-prepared positive and negative electrodes, impregnating with the electrolysis solution and stacking such layers. Disposed as the outermost layer of the laminate was a negative electrode in which a current collector was coated on either surface with the active material-containing slurry. The laminate was enclosed with an aluminum-laminated film, which was sealed to complete a laminate type lithium polymer battery having a capacity of 2500 mAh (1 C).

Example C-2

A battery was manufactured as in Example C-1 except that the non-aqueous electrolysis solution used was obtained by dissolving 1.5 mol·dm$^{-3}$ of $LiPF_6$ as a solute in a solvent mixture of PC+EC+DEC in a volume ratio of 1:1:8, and further dissolving 5 parts by weight of 1,3,2-dioxathiolane-2,2-dioxide.

Example C-3

A battery was manufactured as in Example C-1 except that the non-aqueous electrolysis solution used was obtained by dissolving 1.5 mol·dm$^{-3}$ of $LiPF_6$ as a solute in a solvent mixture of PC+EC+DEC in a volume ratio of 3:1:6, and further dissolving 5 parts by weight of 1,3,2-dioxathiolane-2,2-dioxide.

Example C-4

A battery was manufactured as in Example C-1 except that the non-aqueous electrolysis solution used was obtained by dissolving 1.5 mol·dm$^{-3}$ of $LiPF_6$ as a solute in a solvent mixture of PC+EC+DEC in a volume ratio of 4:1:5, and further dissolving 5 parts by weight of 1,3,2-dioxathiolane-2,2-dioxide.

Example C-5

A battery was manufactured as in Example C-1 except that the non-aqueous electrolysis solution used was obtained by dissolving 1.5 mol·dm$^{-3}$ of $LiPF_6$ as a solute in a solvent mixture of PC+EC+DEC in a volume ratio of 5:1:4, and further dissolving 5 parts by weight of 1,3,2-dioxathiolane-2,2-dioxide.

Example C-6

A battery was manufactured as in Example C-1 except that the non-aqueous electrolysis solution used was obtained by dissolving 1.5 mol·dm$^{-3}$ of $LiPF_6$ as a solute in a solvent mixture of PC+EC+DEC in a volume ratio of 6:1:3, and further dissolving 5 parts by weight of 1,3,2-dioxathiolane-2,2-dioxide.

Example C-7

A battery was manufactured as in Example C-1 except that the non-aqueous electrolysis solution used was obtained by dissolving 1.5 mol·dm$^{-3}$ of $LiPF_6$ as a solute in a solvent mixture of PC+EC+DEC in a volume ratio of 7:1:2, and further dissolving 5 parts by weight of 1,3,2-dioxathiolane-2,2-dioxide.

Example C-8

A battery was manufactured as in Example C-1 except that the non-aqueous electrolysis solution used was obtained by dissolving 2.0 mol·dm$^{-3}$ of $LiPF_6$ as a solute in a solvent mixture of PC+EC+DEC in a volume ratio of 2:1:7, and further dissolving 5 parts by weight of 1,3,2-dioxathiolane-2,2-dioxide.

Example C-9

A battery was manufactured as in Example C-1 except that the non-aqueous electrolysis solution used was obtained by mixing PC, EC and methyl ethyl carbonate (MEC) having a viscosity coefficient of 0.65 mPa·s in a volume ratio of 2:1:7, dissolving $LiPF_6$ as a solute in the solvent mixture in a concentration of 1.5 mol·dm$^{-3}$ and further dissolving 5 parts by weight of 1,3,2-dioxathiolane-2,2-dioxide.

Example C-10

A battery was manufactured as in Example C-1 except that the non-aqueous electrolysis solution used was obtained by mixing PC, EC and dimethyl carbonate (DMC) having a viscosity coefficient of 0.59 mPa·s in a volume ratio of 2:1:7, dissolving $LiPF_6$ as a solute in the solvent mixture in a concentration of 1.5 mol·dm$^{-3}$ and further dissolving 5 parts by weight of 1,3,2-dioxathiolane-2,2-dioxide.

Comparative Example C-1

A battery was manufactured as in Example C-1 except that the electrolysis solution contained 1.5 mol·dm$^{-3}$ of LiPF$_6$ as a solute in a solvent mixture of PC+EC+DEC in a volume ratio of 4:1:5, but not 1,3,2-dioxathiolane-2,2-dioxide.

Comparative Example C-2

A battery was manufactured as in Example C-1 except that the non-aqueous electrolysis solution used was obtained by dissolving 1.0 mol·dm$^{-3}$ of LiPF$_6$ as a solute in a solvent mixture of PC + EC in a volume ratio of 1:1 and further dissolving 5 parts by weight of 1,3,2-dioxathiolane-2,2-dioxide.

Comparative Example C-3

A battery was manufactured as in Example C-1 except that the non-aqueous electrolysis solution used was obtained by dissolving 1.5 mol·dm$^{-3}$ of LiPF$_6$ as a solute in a solvent mixture of PC+EC in a volume ratio of 1:1 and further dissolving 5 parts by weight of 1,3,2-dioxathiolane-2,2-dioxide.

Comparative Example C-4

A battery was manufactured as in Example C-1 except that a non-aqueous electrolysis solution containing 1.5 mol·dm$^{-3}$ of LiPF$_6$ as a solute in a solvent mixture of EC+DEC in a volume ratio of 3:7 was used.

On each of the batteries of Examples C-1 to C-9 and Comparative Examples C-1 to C-4, a charge/discharge test was carried out at 25° C. with a constant current flow of 1 C, a charge cut-off voltage of 4.2 V and a discharge cut-off voltage of 3.0 V. Table 3 shows a charge/discharge efficiency of the first cycle and a capacity retentivity after 100 cycles of 1 C charge/discharge. The results of nail penetration test on the respective samples are also shown in Table 3. In the nail penetration test, the sample was rated "OK" when it did not burst or ignite and "NO" when it burst and ignited immediately after penetrating nail.

Figure 6:
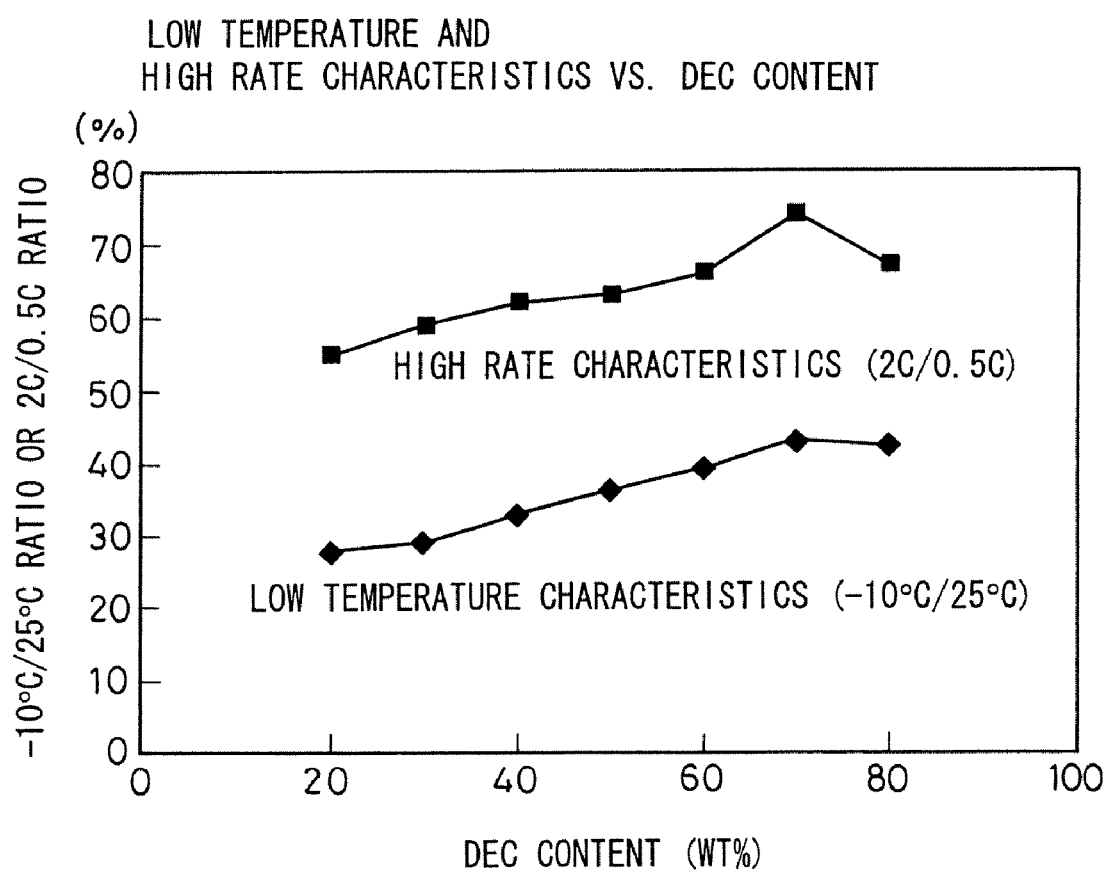
FIG. 6 is a graph showing low-temperature properties and high-rate properties of Examples C and Comparative Examples C, the low-temperature properties being expressed by a ratio of 1 C discharge capacity at −10° C. to 1 C discharge capacity at 25° C. and the high-rate properties being expressed by a ratio of 2 C discharge capacity to 0.5 C discharge capacity.

Low-temperature property is expressed by a ratio of 1 C discharge capacity at −10° C. to 1 C discharge capacity at 25° C. High-rate property is expressed by a ratio of 2 C discharge capacity to 0.5 C discharge capacity. They are plotted in the graph of FIG. 6.

The batteries of Examples C-1 to C-10 showed a satisfactory initial charge/discharge efficiency, with minimized degradation after 100 cycles. In particular, the batteries of Examples C-1 and C-2 showed excellent discharge property at −10° C. In contrast, the battery of Comparative Example C-1 gave off gases and could not be charged. The batteries of Comparative Examples C-2 and C-3 were chargeable, but experienced substantial cycle degradation. When the batteries of Comparative Examples C-2 and C-3 were disintegrated after the test, it was found that graphite had been decomposed. It is presumed that in the batteries of Comparative Examples C-2 and C-3, the electrolysis solution had a high viscosity and low affinity to the electrodes so that unevenness was introduced at the interface between the electrode and the electrolysis solution, which prevented formation of a uniform coat. Presumably, the non-uniform coat permitted decomposition reaction between propylene carbonate and graphite to proceed on the graphite. In particular, substantial decomposition of graphite occurred in the battery of Comparative Example C-3 using an electrolysis solution having a high salt concentration and a high viscosity.

Example D-1

ESCA Analysis

Figure 7:
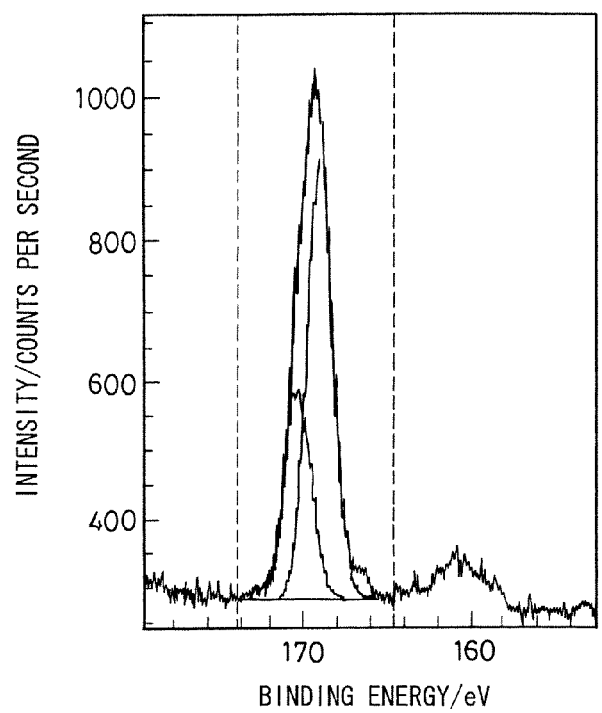
FIG. 7 is a graph showing the S peak by ESCA of a thin film formed on the surface of negative electrode active material prior to a cycle test.
Figure 8:
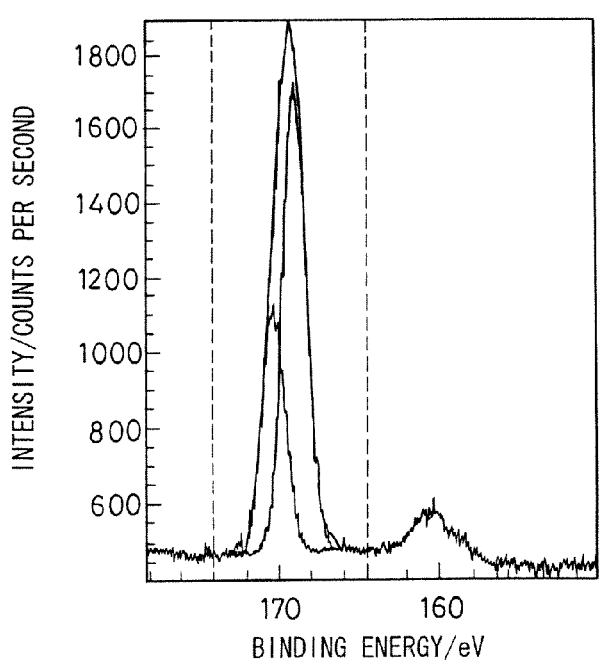
FIG. 8 is a graph showing the S peak by ESCA of a thin film formed on the surface of negative electrode active material after a cycle test.

From the battery of Example B-1, the negative electrode active material was taken out both before the cycle test (but after the first charge/discharge cycle) and after 500 cycles, cleaned and scan on its surface by electron spectroscopy for chemical analysis (ESCA) for measuring the peak of 2p bond energy of S. The instrument used was AXIS-HSX by Shimadzu Mfg. Co., Ltd. The measurement conditions included an x-ray source (Mg-Kα ray) of 12 kV and 20 mA, a scan rate of 300 ms/step and 0.1 eV/step, and a pass energy of 40 eV. The results are shown in FIGS. 7 and 8. Substantially the same results were obtained from the remaining Examples.

The molecular orbital energy of the following compounds: 1,3,2-dioxathiolane-2,2-dioxide, 4-methyl-1,3,2-dioxathiolane-2,2-dioxide, 4-ethyl-1,3,2-dioxathiolane-2,2-dioxide,

TABLE 3

| | Initial charge/ discharge efficiency (%) | Capacity retentivity after 100 cycles (%) | Capacity ratio −10° C./ 25° C. (%) | Capacity ratio 2 C./ 0.5 C. (%) | Nail penetration test |
|---|---|---|---|---|---|
| EX C-1 | 86.1 | 98.1 | 43 | 74 | OK |
| EX C-2 | 87.3 | 97.2 | 42 | 67 | OK |
| EX C-3 | 85.8 | 98.0 | 39 | 66 | OK |
| EX C-4 | 85.5 | 97.6 | 36 | 63 | OK |
| EX C-5 | 85.6 | 97.6 | 33 | 62 | OK |
| EX C-6 | 84.7 | 95.4 | 29 | 59 | OK |
| EX C-7 | 84.6 | 94.5 | 28 | 55 | OK |
| EX C-8 | 86.8 | 93.5 | 31 | 76 | OK |
| EX C-9 | 86.0 | 97.1 | 53 | 88 | OK |
| EX C-10 | 86.5 | 97.4 | 40 | 90 | OK |
| CE C-1 | non-chargeable | — | — | — | OK |
| CE C-2 | 83.0 | 83.0 | 12 | 29 | OK |
| CE C-3 | 75.4 | 21.0 | 14 | 49 | OK |
| CE C-4 | 86.0 | 97.5 | 21 | 60 | OK | and 4-propyl-1,3,2-dioxathiolane-2,2-dioxide was calculated. Calculation can be readily conducted using a computing software. Herein, calculation was made using MOPAC ver. 7.00 and Hamiltonian PM 3. The results are shown in Table 4.

TABLE 4

| Sample | LUMO | HOMO |
|---|---|---|
| 1,3,2-dioxathiolane-2,2-dioxide | +0.006 | −11.609 |
| 4-methyl-1,3,2-dioxathiolane-2,2-dioxide | +0.058 | −11.708 |
| 4-ethyl-1,3,2-dioxathiolane-2,2-dioxide | +0.063 | −11.646 |
| 4-propyl-1,3,2-dioxathiolane-2,2-dioxide | +0.066 | −11.518 |

Example E-1

A positive electrode was prepared by mixing 90 parts by weight of $LiCoO_2$ as a positive electrode active material, 6 parts by weight of carbon black as a conductive agent, and 4 parts by weight of PVdF (Kynar® 761A) as a binder. The positive electrode mix was dispersed in N-methyl-2-pyrrolidone (NMP) as a solvent to form a slurry. The slurry was applied to an Al foil as a current collector and dried to complete the positive electrode. The amount of positive electrode active material loaded per unit area was 24 $mg/cm^2$ and the porosity was 20%.

A negative electrode was prepared by dispersing 90 parts by weight of synthetic graphite powder as a negative electrode active material and 10 parts by weight of PVdF (Kynar® 761A) as a binder in N-methyl-2-pyrrolidone to form a slurry. The slurry was applied to a Cu foil as a current collector and dried to complete the negative electrode. The amount of negative electrode active material loaded per unit area was 12 $mg/cm^2$ and the porosity was 27%.

A non-aqueous electrolysis solution was prepared by dissolving $LiPF_6$ as a supporting salt in a solvent mixture of 30 parts by volume of ethylene carbonate and 70 parts by volume of diethyl carbonate in a salt concentration of 1.5 $mol \cdot dm^{-3}$.

For a solid electrolyte, the following components were used.
Matrix polymer: Kynar® 761A
Polyolefin film: polyethylene (PE) H6022 by Asahi Chemicals Co., Ltd.
Film-forming solution: 2 wt % Kynar® 761A/NMP+1 wt % L-77 (Nippon Unicar Co., Ltd.)

The polyolefin film was immersed in the film-forming solution and then squeezed between rolls for removing the excess film-forming solution. The sheet was admitted into water whereby the polymer in the film-forming solution gelled and became porous on the polyolefin film.

The gel electrolyte sheet thus obtained was sandwiched between the positive and negative electrodes, and such layers were stacked. The laminate was enclosed with an aluminum-laminated film, and impregnated with the electrolysis solution, and the film was sealed by a heat press at 80° C., completing a laminate type solid electrolyte lithium battery.

Example E-2

A laminate type solid electrolyte lithium battery was fabricated as in Example E-1 except that the $LiPF_6$ salt concentration was changed to 1.3 $mol \cdot dm^{-3}$ in the preparation of the electrolysis solution in Example E-1.

Example E-3

A laminate type solid electrolyte lithium battery was fabricated as in Example E-1 except that the $LiPF_6$ salt concentration was changed to 1.75 $mol \cdot dm^{-3}$ in the preparation of the electrolysis solution in Example E-1.

Example E-4

A laminate type solid electrolyte lithium battery was fabricated as in Example E-1 except that the $LiPF_6$ salt concentration was changed to 2.0 $mol \cdot dm^{-3}$ in the preparation of the electrolysis solution in Example E-1.

Example E-5

A laminate type solid electrolyte lithium battery was fabricated as in Example E-1 except that the $LiPF_6$ salt concentration was changed to 2.5 $mol \cdot dm^{-3}$ in the preparation of the electrolysis solution in Example E-1.

Comparative Example E-1

A laminate type solid electrolyte lithium battery was fabricated as in Example E-1 except that the $LiPF_6$ salt concentration was changed to 1.0 $mol \cdot dm^{-3}$ in the preparation of the electrolysis solution in Example E-1.

Comparative Example E-2

A laminate type solid electrolyte lithium battery was fabricated as in Example E-1 except that the amount of positive electrode active material loaded was 17 $mg/cm^2$ and the amount of negative electrode active material loaded was 8.5 $mg/cm^2$.

Comparative Example E-3

A laminate type solid electrolyte lithium battery was fabricated as in Comparative Example E-2 except that the $LiPF_6$ salt concentration was changed to 1.0 $mol \cdot dm^{-3}$ in the preparation of the electrolysis solution in Comparative Example E-2.

Example E-6

A laminate type solid electrolyte lithium battery was fabricated as in Example E-1 except that the amount of positive electrode active material loaded was 28 $mg/cm^2$ and the amount of negative electrode active material loaded was 14 $mg/cm^2$.

Comparative Example E-4

A laminate type solid electrolyte lithium battery was fabricated as in Example E-6 except that the $LiPF_6$ salt concentration was changed to 1.0 $mol \cdot dm^{-3}$ in the preparation of the electrolysis solution in Example E-6.

Comparative Example E-5

A laminate type solid electrolyte lithium battery was fabricated as in Example E-6 except that the porosity of the positive electrode was changed to 34%.

Comparative Example E-6

A laminate type solid electrolyte lithium battery was fabricated as in Example E-6 except that the porosity of the positive electrode was changed to 34% and the $LiPF_6$ salt concentration was changed to 1.0 $mol \cdot dm^{-3}$.

Example E-7

A laminate type solid electrolyte lithium battery was fabricated as in Example E-1 except that the porosity of the positive electrode was changed to 10%.

Comparative Example E-7

A laminate type solid electrolyte lithium battery was fabricated as in Example E-7 except that the LiPF$_6$ salt concentration was changed to 1.0 mol·dm$^{-3}$ in the preparation of the electrolysis solution in Example E-7.

Example E-8

A laminate type solid electrolyte lithium battery was fabricated as in Example E-1 except that the porosity of the positive electrode was changed to 15%.

Comparative Example E-8

A laminate type solid electrolyte lithium battery was fabricated as in Example E-8 except that the LiPF$_6$ salt concentration was changed to 1.0 mol·dm$^{-3}$ in the preparation of the electrolysis solution in Example E-8.

Example E-9

A laminate type solid electrolyte lithium battery was fabricated as in Example E-1 except that the supporting salt was a mixture of 1.3 mol·dm$^{-3}$ of LiN(SO$_2$C$_2$F$_2$)$_2$ and 0.2 mol·dm$^{-3}$ of LiPF$_6$.

Comparative Example E-9

A laminate type solid electrolyte lithium battery was fabricated as in Example E-9 except that the supporting salt was a mixture of 0.8 mol·dm$^{-3}$ of LiN(SO$_2$C$_2$F$_5$)$_2$ and 0.2 mol·dm$^{-3}$ of LiPF$_6$.

Example E-10

A laminate type solid electrolyte lithium battery was fabricated as in Example E-1 except that the non-aqueous electrolysis solution used was obtained by dissolving 1.5 mol·dm$^{-3}$ of LiPF$_6$ as a solute in a solvent mixture of propylene carbonate (PC) and ethylene carbonate (EC) in a volume ratio of 9:1 and further dissolving 5 parts by weight of 1,3,2-dioxathiolane-2,2-dioxide in the preparation of the electrolysis solution in Example E-1.

Example E-11

A laminate type solid electrolyte lithium battery was fabricated as in Example E-1 except that the non-aqueous electrolysis solution used was obtained by dissolving 2.0 mol·dm$^{-3}$ of LiPF$_6$ as a solute in a solvent mixture of PC and EC in a volume ratio of 9:1 and further dissolving 5 parts by weight of 1,3,2-dioxathiolane-2,2-dioxide in the preparation of the electrolysis solution in Example E-1.

Example E-12

A laminate type solid electrolyte lithium battery was fabricated as in Example E-1 except that the non-aqueous electrolysis solution used was obtained by dissolving 2.5 mol·dm$^{-3}$ of LiPF$_6$ as a solute in a solvent mixture of PC and EC in a volume ratio of 9:1 and further dissolving 5 parts by weight of 1,3,2-dioxathiolane-2,2-dioxide in the preparation of the electrolysis solution in Example E-1.

Comparative Example E-10

A laminate type solid electrolyte lithium battery was fabricated as in Example E-10 except that the LiPF$_6$ salt concentration was changed to 1.0 mol·dm$^{-3}$ in the preparation of the electrolysis solution in Example E-10.

Comparative Example E-11

A laminate type solid electrolyte lithium battery was fabricated as in Comparative Example E-10 except that the porosity of the positive electrode was changed to 34%.

Comparative Example E-12

A laminate type solid electrolyte lithium battery was fabricated as in Example E-10 except that the porosity of the positive electrode was changed to 34%.

Comparative Example E-13

A laminate type solid electrolyte lithium battery was fabricated as in Example E-11 except that the porosity of the positive electrode was changed to 34%.

Comparative Example E-14

A laminate type solid electrolyte lithium battery was fabricated as in Example E-12 except that the porosity of the positive electrode was changed to 34%.

The batteries of the foregoing Examples and Comparative Examples were evaluated for discharge rate property by conducting a charge/discharge test at 23° C. under a charge cut-off voltage of 4.2 V with a constant current flow of 0.5 C and a discharge cut-off voltage of 3.0 V with a predetermined current flow. They were also evaluated for cycle performance by repeating a charge/discharge test under a charge cut-off voltage of 4.2 V and a discharge cut-off voltage of 3.0 V with a constant current flow of 1 C. They were further evaluated for low-temperature property by charging at 23° C. with a constant current flow of 1 C until a cut-off voltage of 4.2 V was reached and discharging at different temperatures with a constant current flow of 1 C until a cut-off voltage of 3.0 V was reached.

Figure 9:
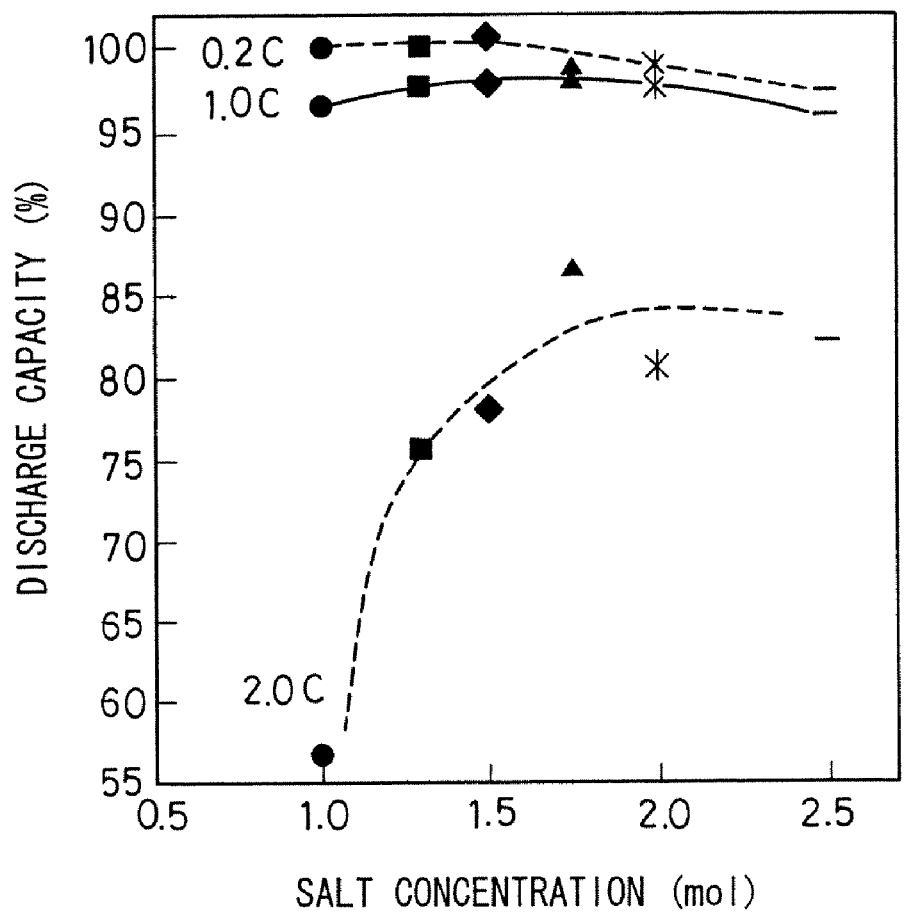
FIG. 9 is a graph showing the discharge capacity at different discharge rates of Examples E-1 to E-5 and Comparative Example E-1.

FIG. 9 shows the discharge capacity at different discharge rates of Examples E-1 to E-5 and Comparative Example E-1. The discharge capacity was expressed as percents based on the 0.2 C discharge capacity (100%) of Comparative Example E-1. Although discharging at a higher rate results in a more reduction of discharge capacity when the salt concentration is 1 M LiPF$_6$ at which the conductivity of electrolysis solution becomes maximum, the degradation of discharge capacity is restrained by setting the salt concentration above 1 M.

Figure 10:
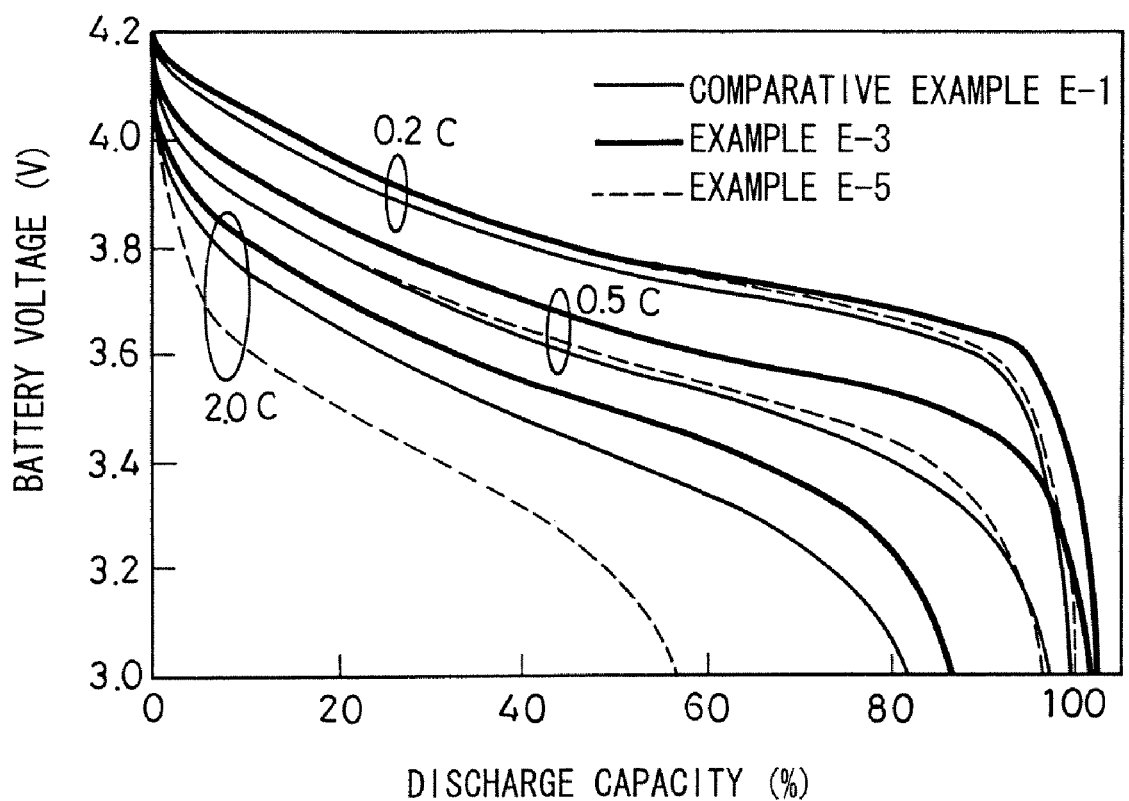
FIG. 10 is a graph showing the discharge curves of Example E-3, Example E-5 and Comparative Example E-1.

FIG. 10 shows the discharge curves of Example E-3, Example E-5 and Comparative Example E-1. A salt concentration of 1 M allows for greater polarization at a high rate so that the capacity degrades, whereas an increased salt concentration restrains polarization. This is presumably because increasing the salt concentration restrains concentration polarization within the electrode so that the degradation of capacity at a high rate is reduced. However, if the salt concentration is increased too high, the viscosity of the electrolysis solution increases to invite a capacity drop which has a significant influence, and especially a degradation of capacity at a low rate.

Figure 11:
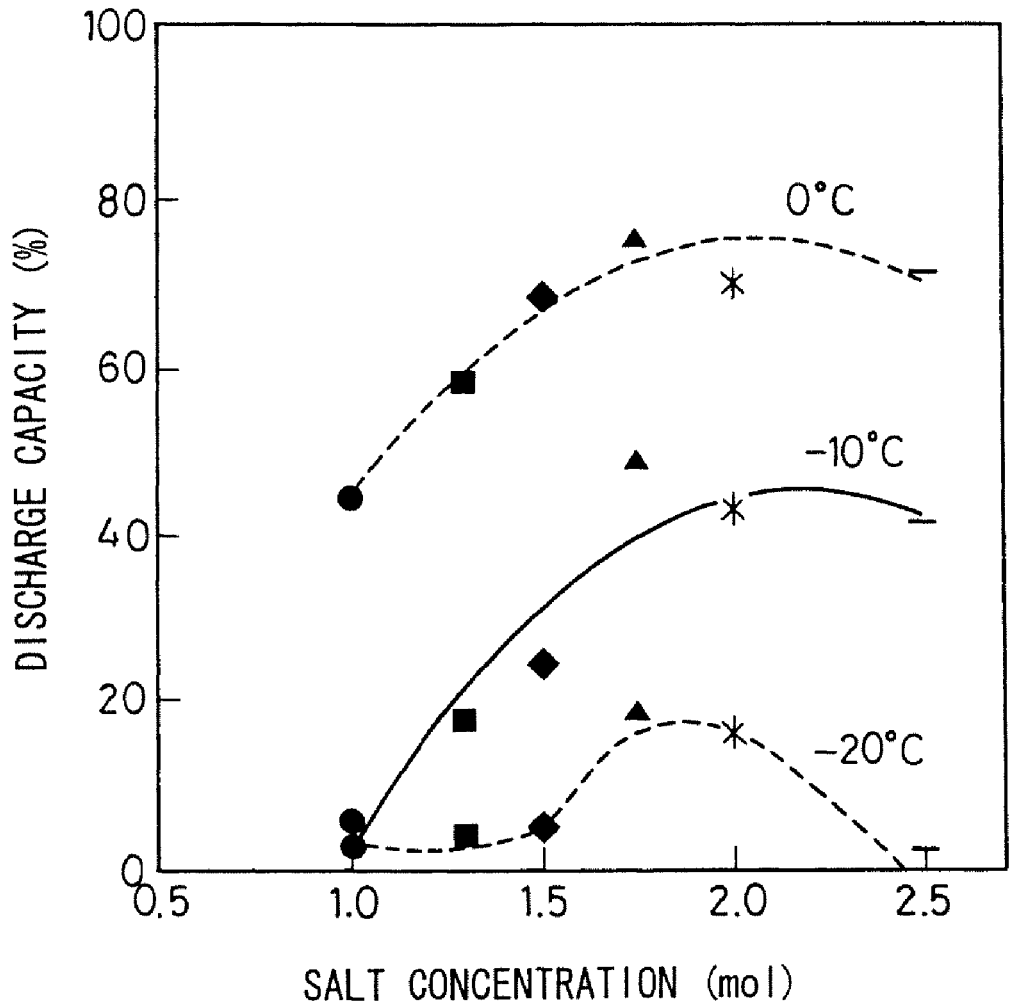
FIG. 11 is a graph showing the 1 C discharge capacity at different temperatures of Examples E-1 to E-5 and Comparative Example E-1.
Figure 12:
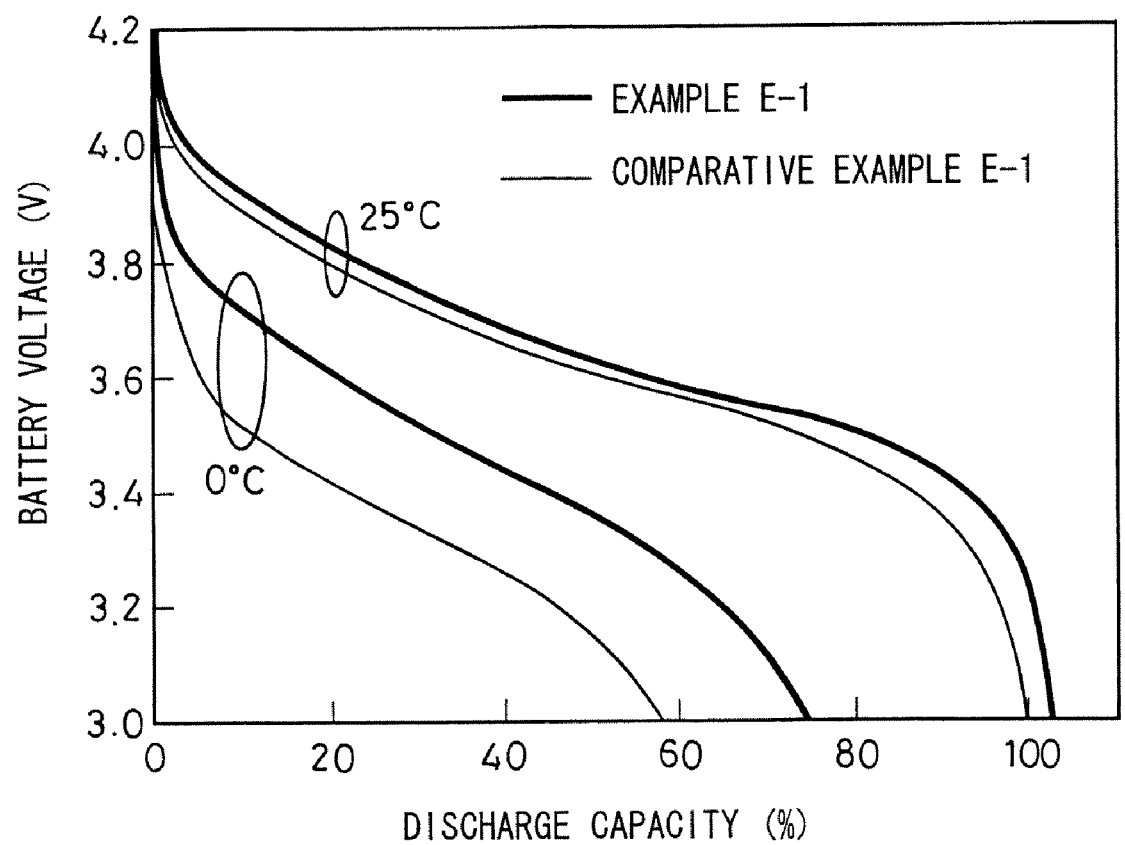
FIG. 12 is a graph showing the discharge curves at 0° C. and 25° C. of Example E-1 and Comparative Example E-1.

FIG. 11 shows the 1 C discharge capacity at different temperatures of Examples E-1 to E-5 and Comparative Example E-1. The discharge capacity was expressed as percents based on the 1 C discharge capacity (100%) at 25° C. of each Example. FIG. 12 shows the discharge curves at 0° C. and 25° C. of Example E-1 and Comparative Example E-1. With respect to low-temperature operation, it is understood that a salt concentration of 1 M allows for greater polarization so that the discharge capacity degrades, whereas an increased salt concentration restrains polarization and thus reduces the degradation of capacity.

Figure 13:
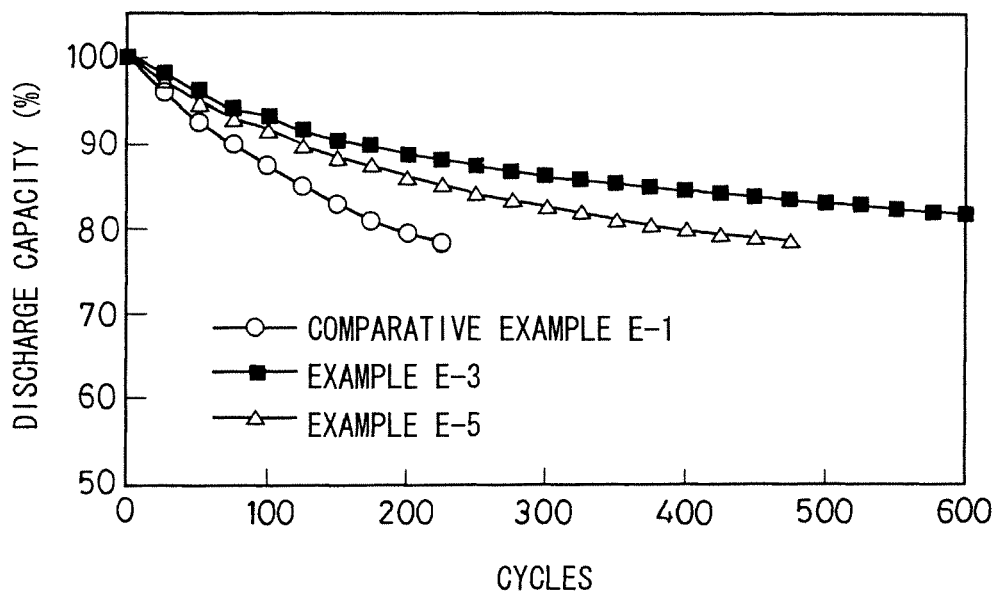
FIG. 13 is a graph showing the 1 C cycle performance of Example E-3, Example E-5 and Comparative Example E-1.

FIG. 13 shows the 1 C cycle performance of Example E-3, Example E-5 and Comparative Example E-1. At a salt concentration of 1 M, the number of cycles repeated until a capacity retentivity of 80% is reached was about 200 cycles, whereas at salt concentrations of 1.75 M and 2.5 M, the number of repeated cycles largely increased to about 600 cycles and about 400 cycles, respectively. This is presumably because an increased salt concentration reduces the localization of Li ions within the electrode, so that more uniform electrode reaction takes place, whereby cycle performance is improved.

Figure 14:
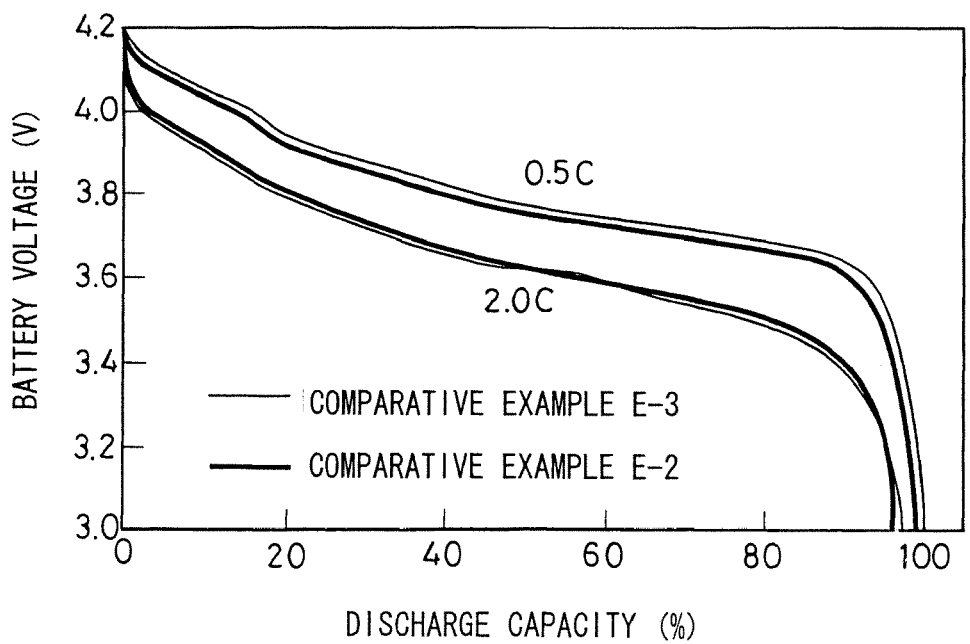
FIG. 14 is a graph showing the discharge curves of Examples E-2 and E-3.
Figure 15:
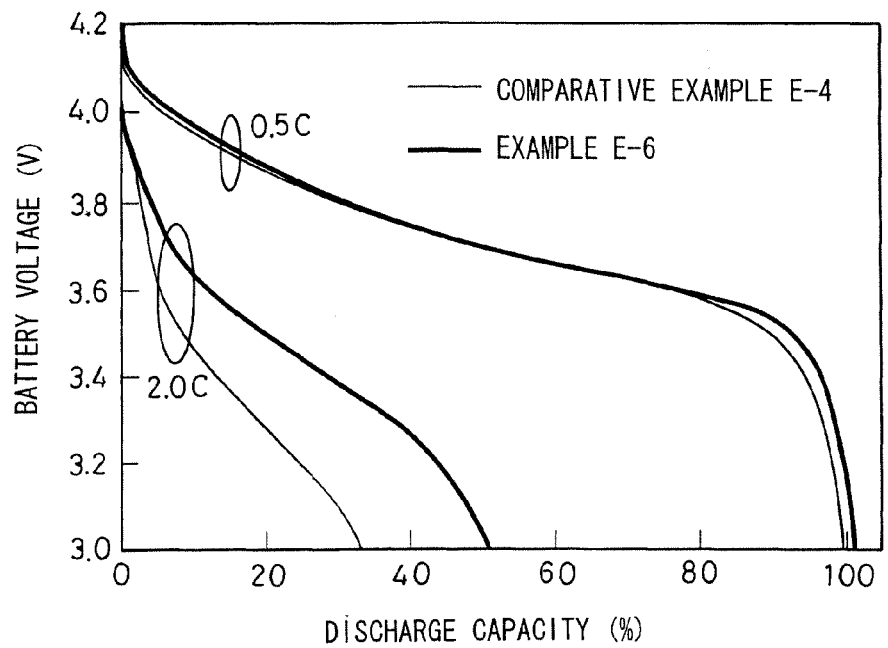
FIG. 15 is a graph showing the polarization-capacity relationship dependent on salt concentration of Example E-6 and Comparative Example E-4.
Figure 16:
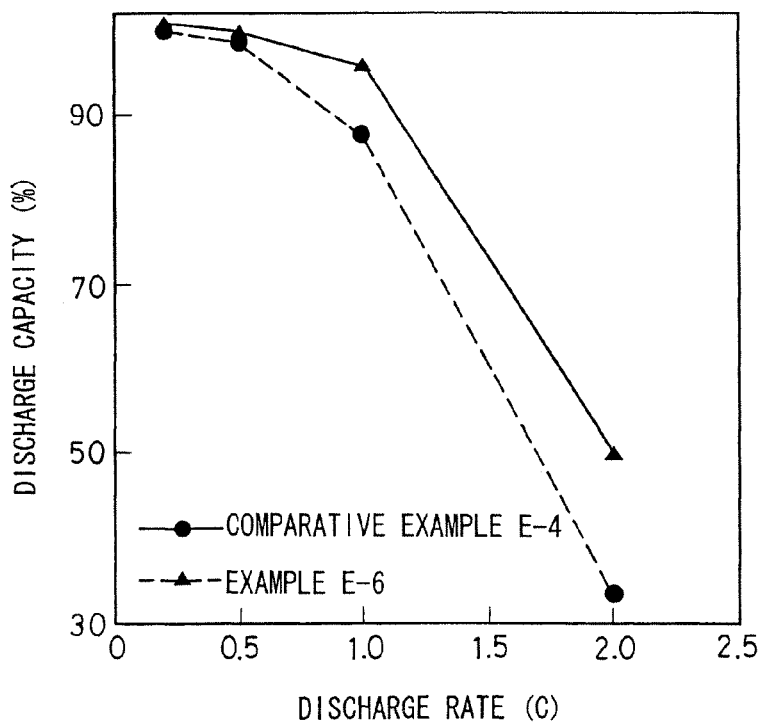
FIG. 16 is a graph showing the charge/discharge capacity vs. discharge rate of Example E-6 and Comparative Example E-4.

FIG. 14 shows the discharge curves of Comparative Examples E-2 and E-3. No improvement in performance was found even when the salt concentration was increased to 1.5 M. For the low porosity electrode, if the amount of active material loaded is small, the diffusion into the electrode interior takes place more rapidly than the reaction at the electrode interface because of a smaller current flow conducting per unit area and the reduced thickness of the electrode. Therefore, in the event of a small amount of active material loaded, improvements in properties due to an increased salt concentration are little. Inversely, in the event of a large amount of active material loaded, increasing the salt concentration is regarded effective because the slow diffusion of Li within the electrode causes more concentration polarization (FIG. 15), and increasing the discharge rate causes a more degradation of capacity (FIG. 16).

Figure 17:
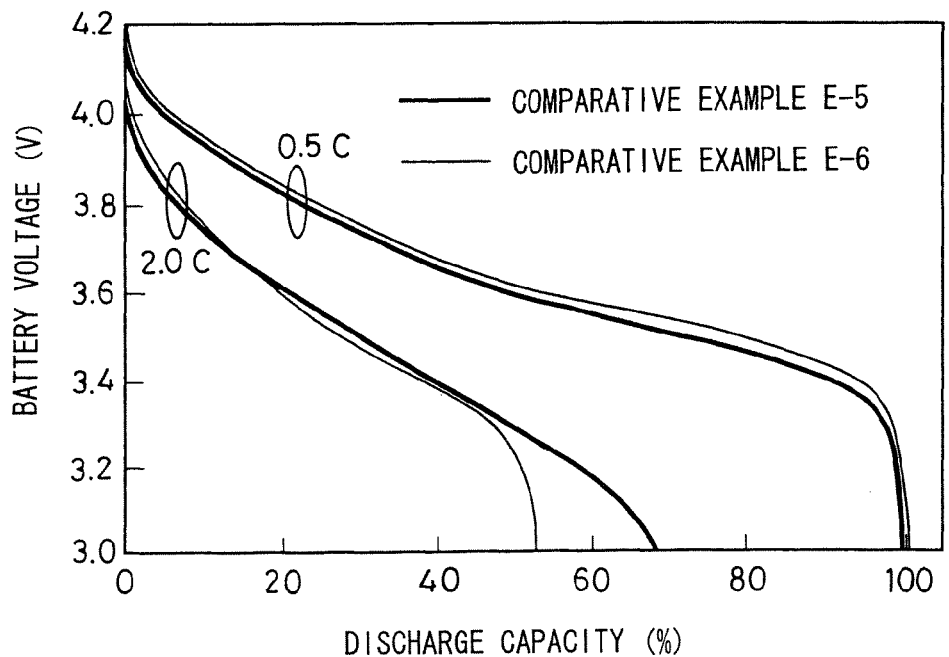
FIG. 17 is a graph showing the discharge curves at a salt concentration of 1 M (Comparative Example E-6) and 1.5 M (Comparative Example E-5) when an electrode having a large amount of active material loaded and a high porosity is used.
Figure 18:
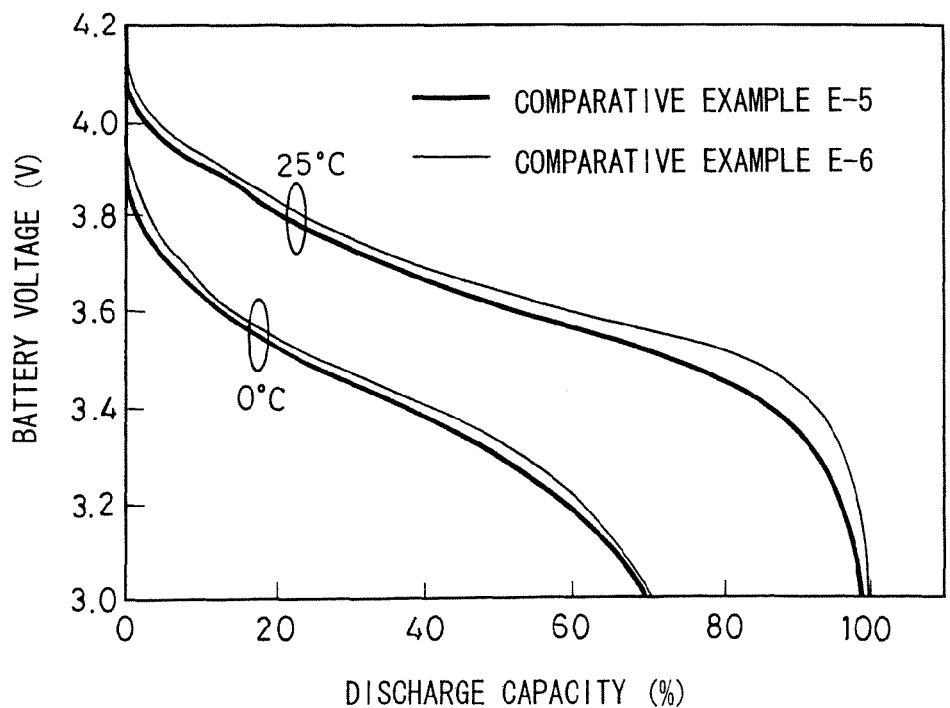
FIG. 18 is a graph showing the 1 C discharge curves at 0° C. and 25° C. when an electrode having a large amount of active material loaded and a high porosity is used.

For the electrode having a large amount of active material loaded and a high porosity, FIG. 17 shows the discharge curves at salt concentrations of 1 M (Comparative Example E-6) and 1.5 M (Comparative Example E-5). FIG. 18 shows the 1 C discharge curves at 0° C. and 25° C. In the event of a large amount of active material loaded, if the porosity was high, an increase of salt concentration improved rate properties to some extent. However, an improvement in polarization as found with the low porosity electrode was not found either at a high rate or at a low temperature.

Figure 19:
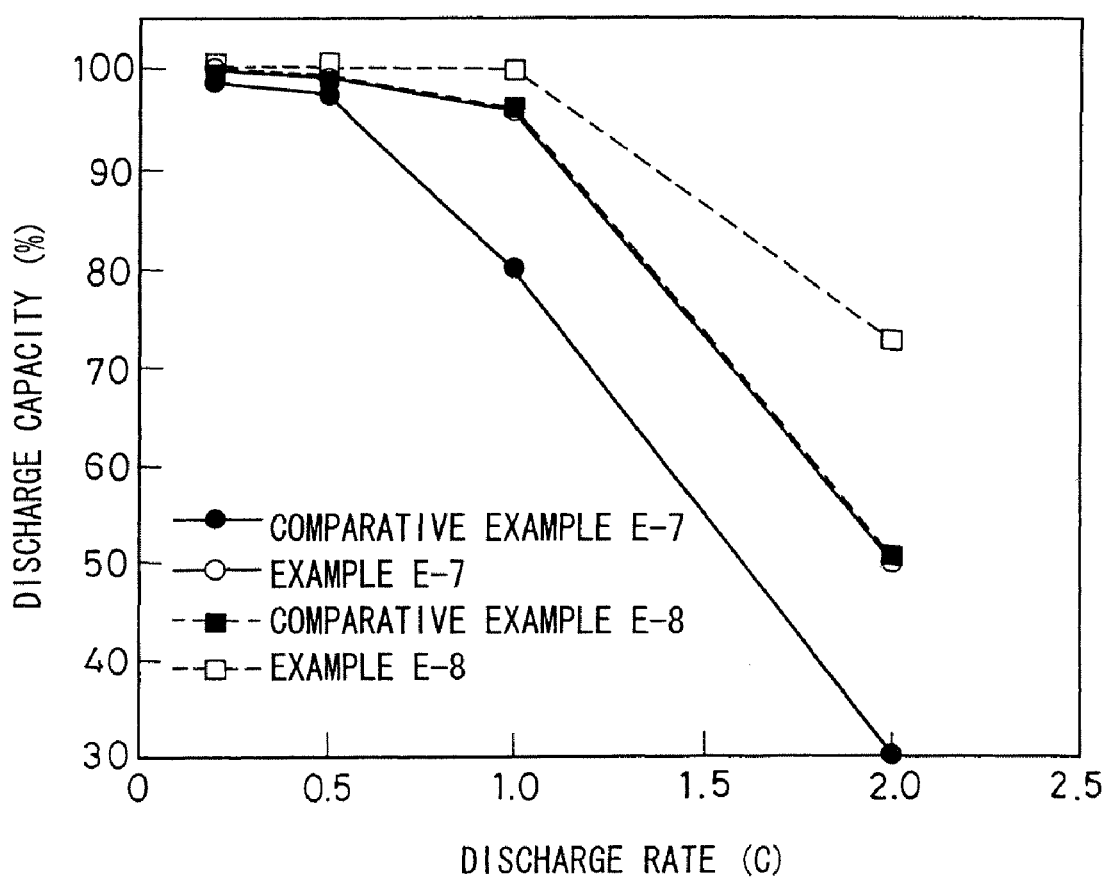
FIG. 19 is a graph showing the discharge rate property of Examples E-7 and E-8, and Comparative Examples E-7 and E-8.

FIG. 19 shows the discharge rate property of Example E-7, Example E-8, Comparative Example E-7 and Comparative Example E-8. It is seen that the discharge rate property degrades as the porosity becomes lower, but such degradation is significantly retarded by increasing the salt concentration.

It is understood from the above results that the polarization that occurs on use of a high energy density electrode having a large amount of active material loaded and a low porosity can be restrained by increasing the supporting salt concentration of the electrolysis solution and that a battery having a high energy density and improved properties is provided.

Figure 20:
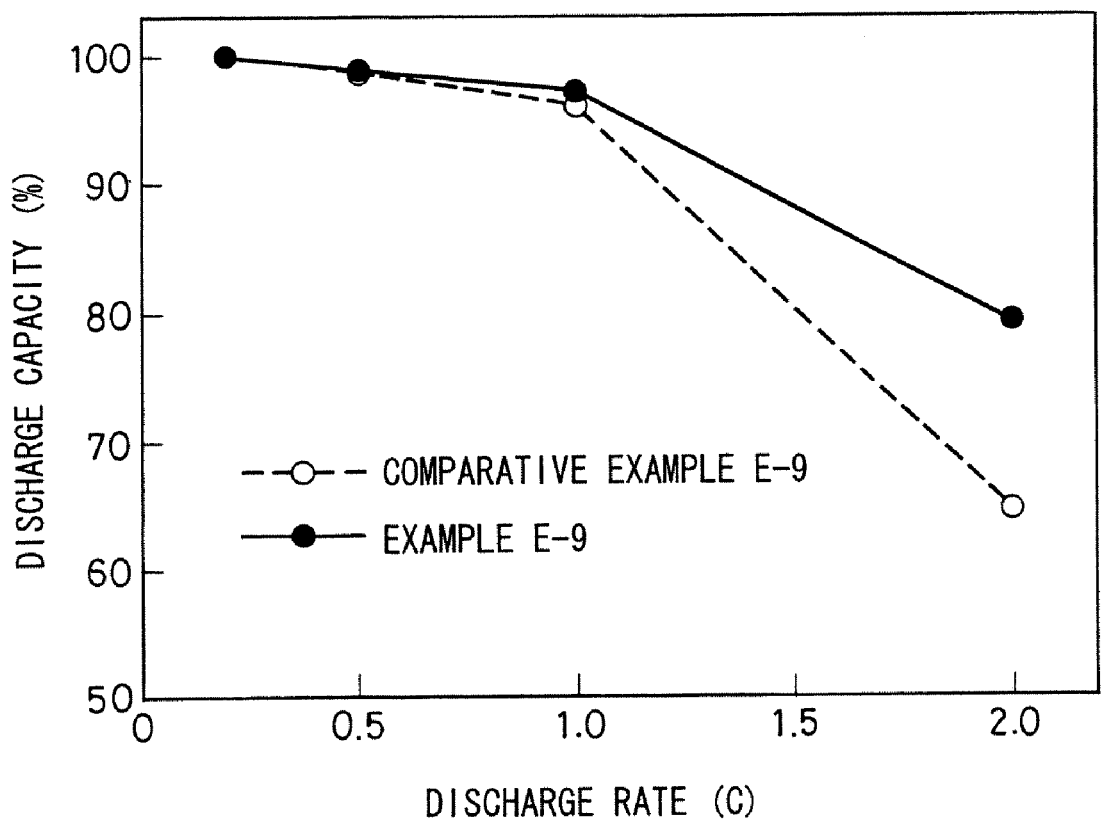
FIG. 20 is a graph showing the discharge capacity vs. discharge rate of Example E-9 and Comparative Example E-9.

FIG. 20 shows the discharge rate property of Example E-9 and Comparative Example E-9. By increasing the concentration of a salt other than $LiPF_6$ such as $LiN(SO_2C_2F_5)_2$, typically to a level above the concentration affording a conductivity peak to the electrolysis solution, the effect of restraining degradation of capacity upon high-rate discharge is also achieved.

Figure 21:
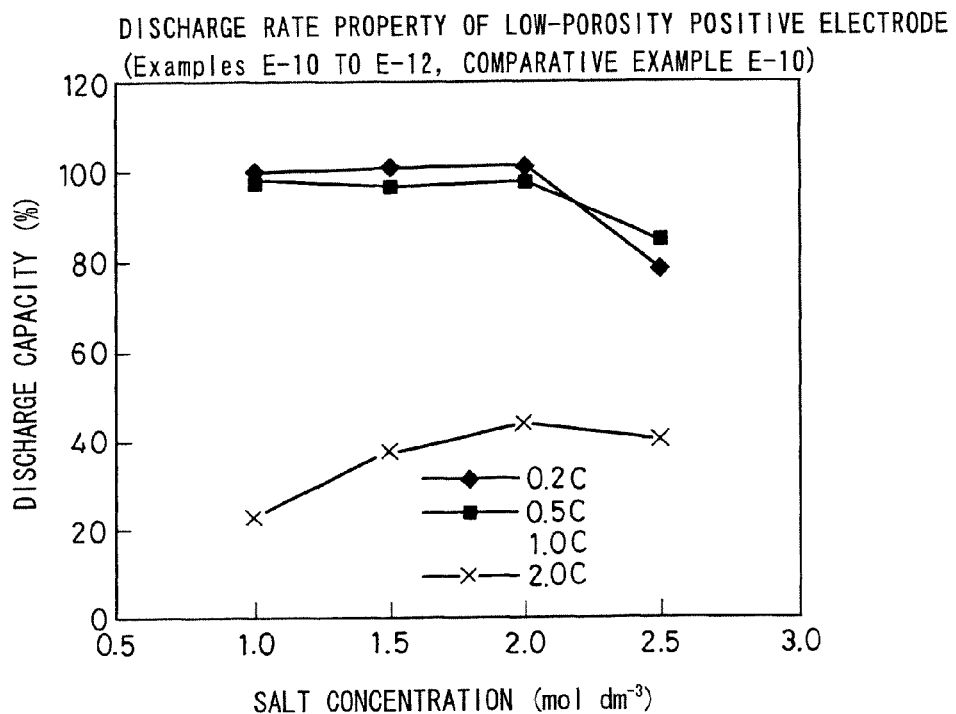
FIG. 21 is a graph showing the discharge rate property of Examples E-10 to E-12 and Comparative Example E-10 using a positive electrode having a low porosity.
Figure 22:
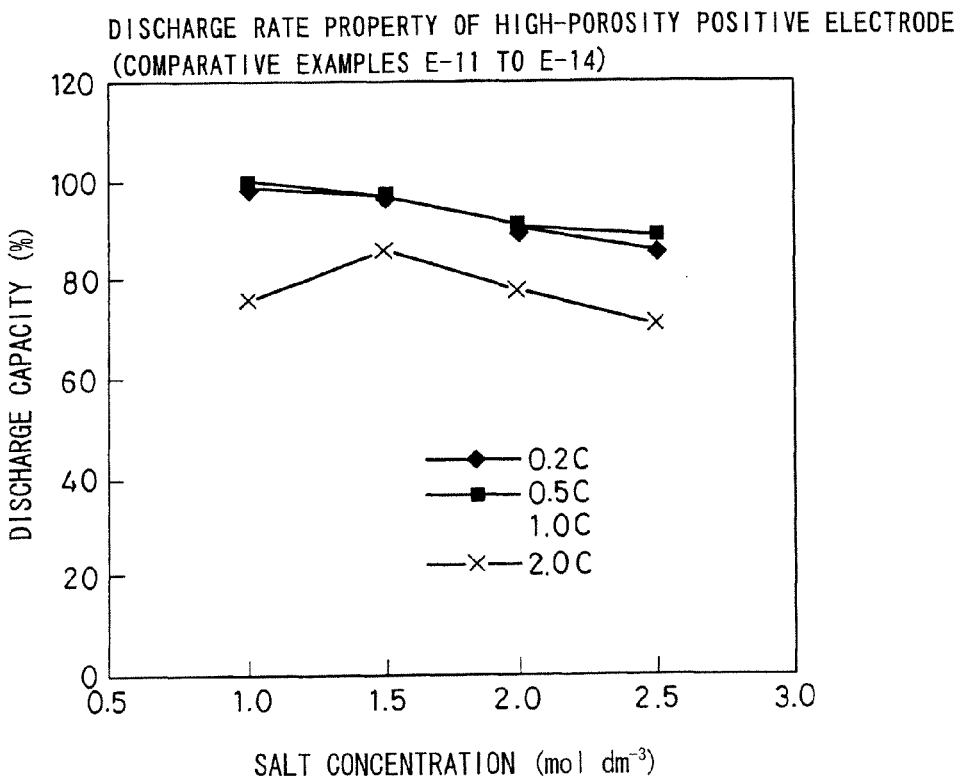
FIG. 22 is a graph showing the discharge rate property of Comparative Examples E-11 to E-14 using a positive electrode having a high porosity.

FIG. 21 shows the discharge rate property of Examples E-10 to E-12 and Comparative Example E-10. FIG. 22 shows the discharge rate property of Comparative Examples E-11 to E-14. Even if the electrolysis solution solvent system is different, in the case of an electrode which has not been compressed to a high density, the effect of restraining degradation of capacity upon high-rate discharge is not achieved by increasing the salt concentration above the concentration affording a conductivity peak to the electrolysis solution. In the case of an electrode which has been compressed to a high density, the significant effect of restraining degradation of capacity upon high-rate discharge is achieved by increasing the salt concentration above the concentration affording a conductivity peak to the electrolysis solution.

It is understood from the above results that when a high density, low porosity electrode is used in a battery, the effect of restraining degradation of high-rate properties or low-temperature properties is achieved even in a solvent system having a high boiling point and low melting point, typically a PC-rich system, by increasing the salt concentration to or above the electrolyte salt concentration affording a conductivity peak and that a lithium secondary battery having improved high-rate and low-temperature properties, high safety and a high energy density is provided.

BENEFITS OF THE INVENTION

According to the invention, a lithium secondary battery having improved battery characteristics including initial charge/discharge efficiency and cycle performance and high safety at elevated temperatures is provided.

Also according to the invention, a lithium secondary battery which is simple to manufacture and easy to handle, can accommodate propylene carbonate, and has improved battery characteristics including charge/discharge efficiency, low-temperature properties and cycle performance is provided.

Further, a battery which restrains decomposition of propylene carbonate and has improved battery characteristics including high-rate properties, low-temperature properties and cycle performance is provided.

Even when an electrode carrying an active material in an amount of at least 10 mg/cm$^2$ is used, a battery having improved battery characteristics including high-rate properties, low-temperature properties and cycle performance is provided.

A high safety battery of a simple structure is provided.

Even when an electrode having a high energy density and a low porosity is used, a non-aqueous electrolyte battery whose high-rate or low-temperature properties is not degraded is provided.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A lithium secondary battery comprising a positive electrode, a negative electrode, a separator and a non-aqueous electrolyte,
   wherein said positive electrode has a porosity of up to 25%, said non-aqueous electrolyte has a salt concentration which ranges from 110-300% of the concentration providing an ion conductivity peak and higher than 1 mol·dm$^{-3}$, and in said positive electrode, an amount of active material loaded per unit area is at least 20 mg/cm$^2$.

2. The lithium secondary battery of claim 1 which has a laminate structure.

3. The lithium secondary battery of claim 1 wherein the non-aqueous electrolyte has a salt concentration which ranges from 130-250% of the concentration providing an ion conductivity peak.

4. The lithium secondary battery of claim 1 wherein said non-aqueous electrolyte has a salt concentration of at least 1.3 mol·dm$^{-3}$.

5. The lithium secondary battery of claim 1 wherein said non-aqueous electrolyte has a salt concentration of about at most 3 mol·dm$^{-3}$.

6. The lithium secondary battery of claim 1 wherein said positive electrode has a porosity of up to 20%.

7. The lithium secondary battery of claim 1 wherein said positive electrode has a porosity of at least about 5%.

8. The lithium secondary battery of claim 1 wherein in said positive electrode, the amount of active material loaded per unit area is at least 23 mg/cm$^2$.

9. The lithium secondary battery of claim 1 wherein in said positive electrode, the amount of active material loaded per unit area is at most about 300 mg/cm$^2$.

* * * * *

UNITED STATES PATENT AND TRADEMARK OFFICE
CERTIFICATE OF CORRECTION

| | | |
|---|---|---|
| PATENT NO. | : 8,142,927 B2 | |
| APPLICATION NO. | : 11/858142 | |
| DATED | : March 27, 2012 | |
| INVENTOR(S) | : Atsushi Sano et al. | |

It is certified that error appears in the above-identified patent and that said Letters Patent is hereby corrected as shown below:

On the title page, Item 75, the inventors information is incorrect. Item 75 should read:

-- (75) Inventor:   Atsushi Sano, Tokyo (JP); Tsuyoshi Iijima, Tokyo (JP); Satoshi Maruyama, Tokyo (JP); Kazuya Ogawa, Tokyo (JP) --

Signed and Sealed this
Eighth Day of May, 2012

David J. Kappos
*Director of the United States Patent and Trademark Office*